(12) United States Patent
Costea et al.

(10) Patent No.: US 12,113,808 B2
(45) Date of Patent: Oct. 8, 2024

(54) CAMPAIGN INTELLIGENCE AND VISUALIZATION FOR COMBATING CYBERATTACKS

(71) Applicant: MICROSOFT TECHNOLOGY LICENSING, LLC, Redmond, WA (US)

(72) Inventors: Mihai Costea, Kirkland, WA (US); Michael Abraham Betser, Kirkland, WA (US); Ravi Kiran Reddy Poluri, Sammamish, WA (US); Hua Ding, Redmond, WA (US); Weisheng Li, Bothell, WA (US); Phanindra Pampati, Sammamish, WA (US); David Nicholas Yost, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 17/088,552

(22) Filed: Nov. 3, 2020

(65) Prior Publication Data

US 2021/0136089 A1 May 6, 2021

Related U.S. Application Data

(60) Provisional application No. 62/929,917, filed on Nov. 3, 2019.

(51) Int. Cl.
*H04L 9/40* (2022.01)
*H04L 41/22* (2022.01)
(Continued)

(52) U.S. Cl.
CPC .......... *H04L 63/1416* (2013.01); *H04L 41/22* (2013.01); *H04L 51/08* (2013.01);
(Continued)

(58) Field of Classification Search
CPC ... H04L 63/1416; H04L 51/212; H04L 51/08; H04L 41/22; H04L 63/1425; H04L 63/1466
See application file for complete search history.

(56) References Cited

U.S. PATENT DOCUMENTS

| | | | |
|---|---|---|---|
| 7,899,871 B1 * | 3/2011 | Kumar | G06Q 10/107 709/206 |
| 9,548,988 B1 | 1/2017 | Roundy et al. | |

(Continued)

OTHER PUBLICATIONS

International Search Report and the Written Opinion Issued in PCT Application No. PCT/US20/058757, dated Jan. 29, 2021, 24 Pages.
(Continued)

*Primary Examiner* — Ryan J Jakovac
(74) *Attorney, Agent, or Firm* — Shook, Hardy & Bacon L.L.P.

(57) ABSTRACT

Methods, systems, and computer storage media for providing a multi-attribute cluster-identifier that supports identifying malicious activity in computing environments. An instance of an activity having an attribute set can be assessed. The attribute set of the instance of the activity is analyzed to determine whether the instance of the activity is a malicious activity. The attribute set of the instance of the activity is compared to a plurality of multi-attribute cluster-identifiers of previous instances of the activity, such that, a determination that the instance of the activity is a malicious activity is made when the attribute set of the instance of the activity corresponds to an identified multi-attribute cluster-identifier. The identified multi-attribute cluster-identifier has a risk score and an attribute set that indicate a likelihood that the instance of the activity is a malicious activity. A visualization that identifies the instance of the activity as a malicious activity is generated.

20 Claims, 22 Drawing Sheets

(51) Int. Cl.
    *H04L 51/08* (2022.01)
    *H04L 51/212* (2022.01)
(52) U.S. Cl.
    CPC ........ *H04L 51/212* (2022.05); *H04L 63/1425* (2013.01); *H04L 63/1466* (2013.01)

(56) References Cited

U.S. PATENT DOCUMENTS

| | | |
|---|---|---|
| 2004/0054498 A1 | 3/2004 | Shipp |
| 2006/0168066 A1 | 7/2006 | Helsper et al. |
| 2018/0270264 A1* | 9/2018 | Cohen .................... G06Q 40/12 |
| 2019/0260785 A1 | 8/2019 | Jenkinson et al. |
| 2020/0067978 A1 | 2/2020 | Jakobsson |

OTHER PUBLICATIONS

"Notice of Allowance Issued in European Patent Application No. 20816697.5", dated Aug. 1, 2023, 8 Pages.
"Notice of Allowance Issued in European Patent Application No. 20816697.5", Mailed Date: Nov. 8, 2023, 8 Pages.
Extended European Search Report received for EP Application No. 23206708.2, mailed on Jan. 18, 2024, 5 pages.

* cited by examiner

| IP | IP Range | Bin1 | Sender Domain | Sender auth | URL Domain | Fingerprint Centroid | ... | Whois | ...first contact infra | Display Name | Subject | Email context regEx | ... Target clusters | Image hash (Photo DNA) |
|---|---|---|---|---|---|---|---|---|---|---|---|---|---|---|
| Rackspace shared IP | | 2 mails | Legit small | No auth | Legit | | | | | | | | | |
| | | | | Found another sender! | | Clusters! | | | | | | | | |
| | | | | | | | | | | | | | | |
| | | | | Found three more senders | | Found three more clusters | | | | | | | | |
| | | | | | | | | | | | | | | |

FIG. 8

| Example Attributes | |
|---|---|
| SenderDomainFirstContactTenantCount | 1 |
| SuspiciousMin | 0.8363391872018759 |
| FirstContactCount | 0.7538596736289797 |
| IPCountRatio | 0.5958027036739633 |
| AuthPassCountRatio | 0.5945689029901488 |
| IPCount | 0.5101472331964520 |
| AuthFailCountRatio | 0.5080532070935324 |
| P1CountRatio | 0.4827914391166556 |
| BadVerdictCountRatio | 0.4819311304219441 |
| FirstContactRatio | 0.4676546751489328 |
| SenderDomainFCRatio | 0.4546306328189024 |
| SuspiciousMean | 0.4529193976413260 |
| AuthPassCount | 0.4241036090765796 |
| Slash24CountRatio | 0.4133894451250628 |
| SenderGoodCount | 0.4061286089568547 |
| RecipientCountRatio | 0.3986990528416187 |
| P2CountRatio | 0.3904873424804098 |
| SenderFCRatio | 0.3788892052832017 |
| URLHostFirstContactTenantCount | 0.3747016099259843 |
| URLCount | 0.3744008901221826 |

FIG. 9

CAMPAIGN INTELLIGENCE AND VISUALIZATION FOR COMBATING CYBERATTACKS

CROSS-REFERENCING SECTION

This application claims the benefit of provisional U.S. Application No. 62/929,917 filed Nov. 3, 2019 which is herein incorporated by reference in its entirety for all purposes.

BACKGROUND

Users often rely on computing resources such as applications and services to perform various computing tasks. Computing resources can be exposed to different types of malicious activities that limit the capacity for the computing resources to operate. For example, cyberattacks continue to be a growing pathway for malicious actors to attempt to expose, steal, destroy, or gain unauthorized access to assets of an individual or company. Specifically, email attacks continue to be an entry point for attackers against enterprise customers of computing environments and can trigger damaging consequences.

Generally, email attacks do not target a single individual. Attackers typically target numerous individuals at once via waves of email attacks. These campaigns often persist for periods of time in an effort to break through various email filters and reach potential victims. In order to generate an effective campaign, an attacker can first set the sending infrastructure (e.g., secure sending domains with or without authentication, sending IPs, sending email scripts, etc.). Once the infrastructure is formed, an email template with a particular payload (e.g., URL hosting, infected documents attached to the email, etc.) can be created to trick and entice users to interact with the email to deliver the payload. Additionally, a post-delivery attack chain (e.g., capturing credentials for phishing attacks or other malware) can be embedded in email, so that, attackers can gather information from their delivered payloads. Due to the increase in sophisticated incident detection, cybercriminals are constantly changing their tactics to effectively target the greatest number of individuals. As such, it is important to develop cyber security systems to reduce or prevent cyberattack targeted at computing environments.

SUMMARY

Various aspects of the technology described herein are generally directed to systems, methods, and computer storage media, for among other things, providing a multi-attribute cluster-identifier (i.e., an enhanced multi-attribute-based fingerprint for clusters) that supports identifying malicious activity (e.g., malicious email campaigns) in computing environments (e.g., a distributed computing environment). An instance of an activity (e.g., an email message) having an attribute set can be assessed. The attribute set of the instance of the activity is analyzed to determine whether the instance of the activity is a malicious activity. In particular, the attribute set of the instance of the activity is compared to a plurality of multi-attribute cluster-identifiers of previous instances of the activity, such that, a determination that the instance of the activity is a malicious activity is made when the attribute set of the instance of the activity corresponds to an identified multi-attribute cluster-identifier. The identified multi-attribute cluster-identifier a risk score and an attribute set indicates a likelihood that the instance of the activity is a malicious activity.

For example, a plurality of multi-attribute cluster-identifiers for email campaigns can be generated based on attribute sets of previous emails in the email campaigns. A malicious activity manager can then monitor the computing environment and analyze an instance of an activity (e.g., an email) to support making a determination whether the instance of the activity is a malicious activity. An email is identified as a malicious activity when an attribute set of the email corresponds to a multi-attribute cluster-identifier having a risk score and the attribute set, where the risk score and the attribute set indicate a likelihood that an instance of an activity is a malicious activity.

In operation, the malicious activity manager of a malicious activity management system supports generating a plurality of multi-attribute cluster-identifiers having corresponding risk scores and attribute sets. Generating a multi-attribute cluster-identifier is based on clustering analysis and malicious activity determination models that support determining that an attribute set of an activity has a quantified risk (i.e., risk score) that indicates that the activity is a malicious activity. Generating the multi-attribute cluster-identifier for an activity (e.g., email campaign) can be based on initially clustering instances of the activity based on a corresponding attribute set (e.g., an attribute set of the emails in the email campaign).

A malicious activity manager then operates to monitor a computing environment and analyzes an instance of an activity (e.g., an email) and matches an attribute set of the instance to an identified multi-attribute cluster-identifier that indicates activity is a malicious activity. In this way, a multi-attribute cluster-identifier corresponding to the type of malicious activity supports effectively identifying an instance of an activity that is processed in the computing environment as a malicious activity.

The malicious activity manager further supports providing visualizations of malicious activity operations data. The visualizations are associated with different functions and features of the malicious activity manager (e.g., clustering analysis, risks scores, sets of attributes, evaluation results). The visualizations are provided to allow effective operation and control of the malicious activity manager from a user interface perspective, while the malicious activity manager simultaneously feeds back information in making decisions for malicious activity management.

The operations of the malicious activity manager ("malicious activity management operations") and additional functional components are executed as an algorithm for performing the specific functions for malicious activity management. In this way, the malicious activity management operations support limiting or preventing malicious activity in computing environments, where malicious actors continuously alter theirs strategies of executing malicious activities. The malicious activity management operations further support providing visualizations of malicious activity operations data that are helpful to users and improve computer efficiency in decision-making and in user navigation of graphical user interfaces for malicious activity management.

BRIEF DESCRIPTION OF THE DRAWINGS

The technology described herein is described in detail below with reference to the attached drawing figures, wherein:

FIG. 8 is an example illustration of malicious activity management processing data for providing malicious activity management operations, in accordance with aspects of the technology described herein;

FIG. 9 is an example illustration of malicious activity management processing data for providing malicious activity management operations, in accordance with aspects of the technology described herein;

DETAILED DESCRIPTION

Figure 1A:
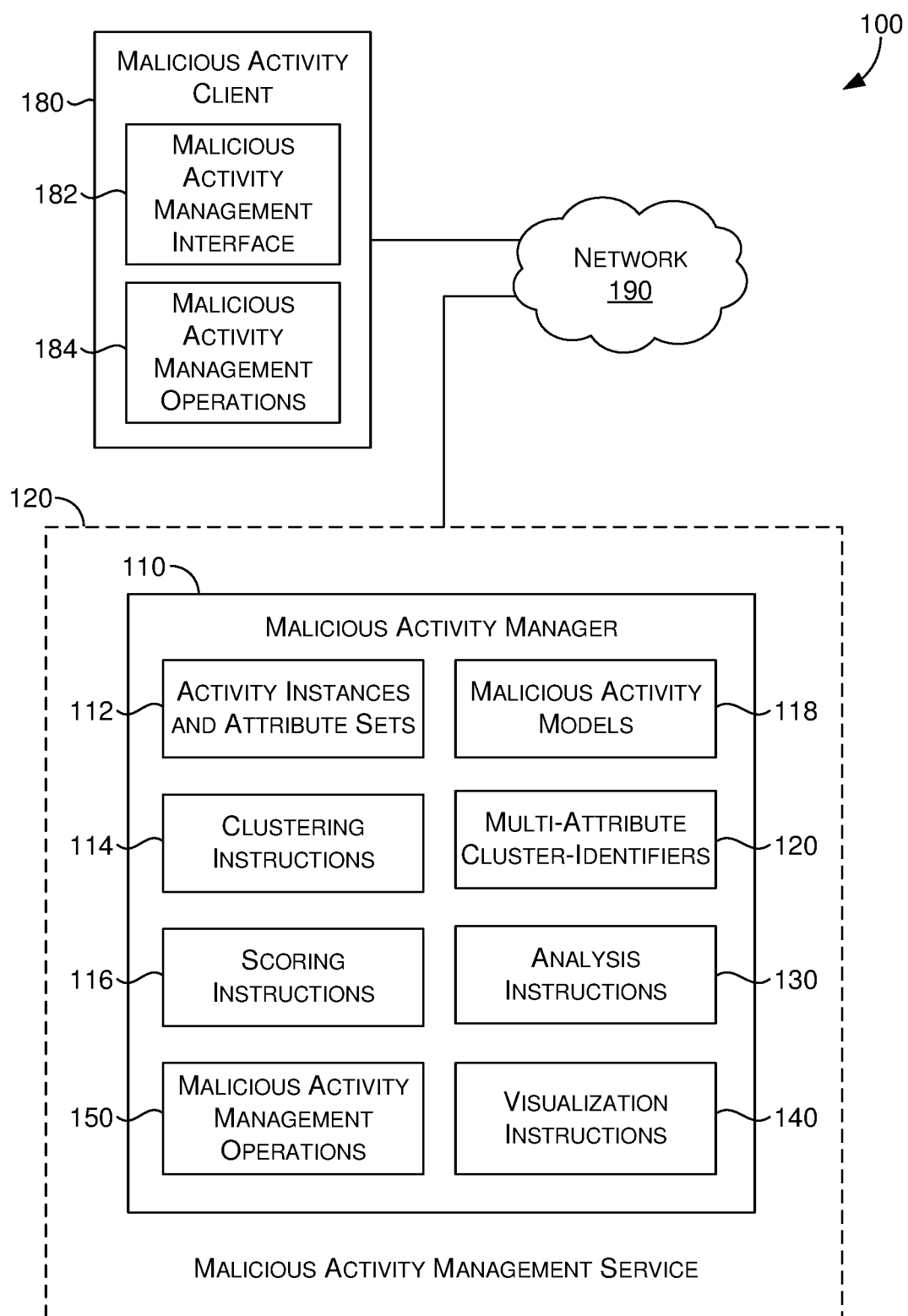
FIGS. 1A-1D illustrate block diagrams of an example malicious activity management environment for providing malicious activity management operations using a malicious activity manager, suitable for use in implementing aspects of the technology described herein.

Overview of Technical Problems, Technical Solutions, and Technological Improvements Email initiated cyberattacks continue to be the preferred avenue for cybercriminals across the globe. By sending waves of emails at once, threat actors are better able to reach potential victims. The email messages used in these campaigns are often highly customized to resemble legitimate messages and to avoid the sophisticated filtering systems used by security operations teams. By operating campaigns over a period of time, threat actors are able to effectively gauge their hit rate to ensure their chances of success. Additionally, attackers are able to continuously aggregate and update malicious campaigns by quickly adapting their infrastructure, email templates, payloads, and post-delivery attack chains to ensure their chances of success. The swift movement by threat actors is a challenge for security operations teams who are tasked with thwarting these dangerous and evolving campaigns.

Conventionally, the process for identifying, investigating, and responding to potential security incidents is a rigorous and complex process that involves manual intervention at all stages of the process. Intelligently correlating potential threats based on indicators of compromise ("IOCs") across a large, enterprise organization is difficult, time-consuming, and expensive. Security operations teams using conventional cyber security systems (e.g., a cybersecurity management component) are constantly monitoring for IOCs by creating queries to analyze email activity as well as manually examining emails for patterns of compromise based on email content and traffic. However, because attackers are constantly developing and changing their campaigns (i.e., a systematic computer- or network-based attack), it is very difficult to correlate a single potentially malicious email with other threats across a large dataset.

By way of example, email phishing attacks have various features that are analyzed manually by security operations teams and automatically by email filtering systems. Attackers are able to observe how their email campaigns interact with their targets' threat detection systems and adapt various features of their email campaigns to beat the filtering mechanisms. For example, cybercriminals may change the subject line, the sending domain, URLs, or a combination of any other features, to successfully get an email in a targets inbox. As such, there is a desire to automatically observe emails for IOCs across large volumes of data to recognize malicious email campaigns.

Moreover, conventional cyber security systems analyze emails on a case-by-case basis by examining many features of an email to determine the legitimacy of the email. For example, a cybersecurity management component may analyze unique features of an email (e.g., a fingerprint) of an email with known malicious email features (i.e., known malicious email fingerprints) as one indicator of a potential threat. But, fingerprints of emails are often misleading and unreliable for identifying potential threats because an email fingerprint is generated based on the content of the email. Thus, using email fingerprints to identify spam, malicious emails often bypass a filtering system or are undetected by a security operations team because the malicious emails often have the same or similar fingerprint to legitimate emails. In this way, there is a need for grouping emails to enhance the speed of detecting potential attacks across a large dataset. As such a comprehensive malicious activity management system that addresses the limitations of conventional system would improve malicious activity management operations and malicious activity interfaces that support identifying malicious activity in computing environments.

Embodiments of the present invention are directed to simple and efficient methods, systems, and computer storage media for providing a multi-attribute cluster-identifier (i.e., an enhanced multi-attribute-based fingerprint for clusters) that supports identifying malicious activity (e.g., malicious email campaigns) in computing environments (e.g., a distributed computing environment). An instance of an activity (e.g., an email message) having an attribute set can be assessed. The attribute set of the instance of the activity is analyzed to determine whether the instance of the activity is a malicious activity. In particular, the attribute set of the instance of the activity is compared to a plurality of multi-attribute cluster-identifiers of previous instances of the activity, such that, a determination that the instance of the activity is a malicious activity is made when the attribute set of the instance of the activity corresponds to an identified multi-attribute cluster-identifier. The identified multi-attribute cluster-identifier a risk score and an attribute set indicates a likelihood that the instance of the activity is a malicious activity.

By way of example, a malicious activity management system can support clustering instances of an activity (e.g., a cyberattack) based on attributes associated with the activity. The clusters of instances of the cyberattack can be analyzed, based on visualizations and interpretations of cluster segments of the instance of the activity (e.g., cyberattack segments), to generate multi-attribute cluster-identifiers. For example, by clustering emails in a single cyberattack campaign over a period of time (e.g., days, weeks, months, etc.), malicious activity management operations can assist in determining the nature of the cyberattack and its impact. Features of a campaign, such as IOCs, spanning a large dataset are identified and showcase a cybercriminal's infrastructure used for email sending and payload hosting. Clustering emails into one coherent entity (i.e., a cyberattack segment) for visualizing attacker specific signals and tenant policies (e.g., SafeSenders, technical reports, etc.) allows for quick triage to determine the degree of urgency of the email campaign. Additionally, malicious activity management operations support effective remediation efforts by allowing bulk actions to be taken on all emails identified in the campaign. As such, the malicious activity management system is able to efficiently combat attackers' fast-changing email campaigns by clustering emails according to associated attributes indicative of malicious activity.

To identify which emails are part of the same campaign, malicious activity management operations support analyzing multiple attributes of the mail to link the campaign together. To build the campaign, malicious activity management operations support linking together the various metadata values and apply filters at each step to reduce false positives. For example, a cluster may be built based on expanding a single centroid of a cluster to include other centroids by iteratively analyzing and filtering out certain attributes of an attacker's infrastructure (e.g., sending IP address, subject fingerprint, originating client IP, etc.). For each campaign that is discovered, malicious activity management operations will create a campaign guide. The campaign guide links to the metadata properties that are a part of the campaign (e.g., URL domains, IP addresses, etc.). As a result, a campaign and its associated guide include a vast number of emails with similar attributes indicative of potentially malicious activity.

Based on metadata of the individual email messages in a campaign, malicious activity management operations can compute email clusters and aggregate stats or properties for these clusters of emails. Clustering is effective because some aspects of a campaign will have similar attributes and infrastructure as legitimate emails. For example, an email might be sent from a legitimate provider such as outlook.com or some server compromised and hosts phishing websites before being taken down. In these instances, it is contemplated that emails that pertain to a cyberattack and not those that are legitimate in the clusters are included.

Specifically, using machine learning techniques, malicious activity management operations can automatically cluster emails into a campaign by learning over a multitude of cyberattack attempts. Using a fuzzy clustering technique, the emails can be grouped based on locality-sensitive hashing (LSH) fingerprints and subsequently expand the cluster to capture potential anomalous emails based on similar attributes in other emails (note: LSH fingerprints are based on a technique that support deriving fingerprints from any type of document or content). Because LSH fingerprints are based on the text of an email message, or any other document or content, (excluding URLs and HTML structure), the distance between two LSH fingerprints that have similar content is very close. After generating a cluster based on the fingerprints of emails, multiple clustering steps may be performed to aggregate similar clusters and smaller clusters and outliers may be filtered out to produce a final cluster that may be used to calculate a risk score. As such, clusters of potentially harmful email messages may be produced at any time for further analysis.

Additionally, malicious activity management operations support assigning a risk score to each cluster based on actions that filter email messages or actions other users took on email messages in the cluster. For example, if most users receiving emails in a particular campaign have never received an email form the particular sender, then this heightens the level of suspiciousness that the campaign is malicious. As another example, if some of the users receiving emails in a particular campaign moved the emails to "junk" folder, then this is also a sign that the entire campaign is not legitimate. As yet another example, if malware detection software determined that attachments in some of the email messages in the campaign are infected with potentially harmful code, it is very likely that all attachments in emails in the campaign sent by the same sender, at the same time, with a similar content template are also infected.

A risk score for a cluster may be calculated based on a suspicion score, anomaly score, and impact score generated by separate models. Each score model can operate on a tenant level, a global level, and a combined level. A trained suspicion score model uses historical data and aggregates information regarding various features and attributes of the cluster (e.g., ratio of the first time the sender domain has contacted the tenant or any other client on a global scale). A trained anomaly model analyzes the historical data and whether emails in the cluster were a new sender to a tenant, a new link host to a tenant, or an old sender to a tenant from a new location and new link to tenant. For the trained anomaly model, historical data is defined at the tenant level and defined over a closed period of time (e.g., six months). Three examples of historical data are the history of the sender, history of the geo location, and history of the link host. Features of the historical data include the age of the relationship, the number of days seen, the total number of message (tenant divided by the global), and total number of bad messages (tenant divided by the global).

The impact score model can be divided into example impact scores such as, but not limited to, a high value employee (HVE) score, content classification score, and website impact score. The HVE model uses email communication patters to construct a graph of user with consistent email communications to identify which employees are being targeted by a specific email cluster. The HVE model aims at identifying employees that if compromised would result in a bigger impact for a customer. For example, CEOs if compromised can approve payments. Admins have special access to sensitive data among other privileges and rights. The content classification model uses machine learning techniques based on hashed subject and body tokens of email message as well as structural features to identify messages asking for attributes such as credentials.

Lastly, the website impact model, which may be implemented as part of the suspicion model, separately, or in any other suitable manner, analyzes whether websites found in an email in the cluster are malicious based on whether the website includes form entries, form entries collecting passwords, and if the websites resembles a proprietary website (e.g., Office365). Other factors used by embodiments disclosed herein to determine the risk score for a cluster include target metadata (e.g., if a campaign is targeting multiple users with administrative roles in IT management, members of the executive or finance teams, etc., the risk score will increase), campaign growth (if a campaign is growing in volume over a period of time, the risk score increases because it implies that larger volumes will be coming in the future), user actions (e.g., if a campaign is seeing a large percentage of recipients clicking on hyperlinks or other items in the email it means that the email was crafted and appeared credible, therefore the risk is higher), and payload type (e.g., a malware campaign that attempts to infect Windows devices will not cause a lot of harm if it is hitting a mobile device with a different OS), among others.

Explained further, an email message can belong to many different types of clusters. The fuzzy content cluster is one example, the payload (website, malware, etc.) cluster is another example. Multi-attribute aggregates are also possible and each one may have its own associated suspicious score. Multiple suspicious scores can be combined into a single aggregated value. The aggregation could be the result of a statistical combination or a trained model augmented by heuristics if needed. An example of a distinction between a suspicion score and an anomaly score is that the suspicion score may be derived as a result of a supervised training approach (e.g., where labeled data is accessible for both what we think is good or bad and the systems automatically learns it). The anomaly score may be, but does not have to be, the result of an unsupervised statistical analysis or heuristics. Lastly, an impact score may assess the damage if a compromise was successful.

As a result of calculating an overall risk score, malicious activity management operations may take various actions based on the severity of the risk score. For example, a campaign may be blocked so that future emails fitting the profile of email messages in the campaign no longer reach their intended recipients. As another example, prioritized alerts can be triggered based on the risk score so that security operations processers and personnel can remediate issues before victims are (e.g., entering credentials into a malicious web form, installing malware on a user device, etc.). As a further example, affected users and devices may be automatically contained and conditional access may be automatically applied on data access. Moreover, malicious activity management operations may support automatically responding to incidents. For example, malicious emails may be automatically removed and affected or infected devices may be automatically remediated by embodiments of the present invention. As another example, malicious activity management operations may further support automatically cleaning-up of any policy or configuration issues. Yet another example, URLs/senders that may be or are determined to be malicious (or at least potentially malicious) may be automatically blocked if they were not previously blocked.

A risk score associated with a cluster also allows for quick and efficient exploration of a particular email campaign. For example, a user on a security operations team needs to prioritize emails with the highest associated risk. A risk score (e.g., high, medium, or low) would allow the user to quickly view which email clusters present the greatest threat to an organization. Transmitting the risk score and associated information about the campaign to a UI provides a power visualization tool for users. Users may expand a highly dangerous campaign to view details regarding the campaign (e.g., IOCs) and take bulk action on all emails in the campaign. For example, sending an alert to individuals who received an email message as a part of a campaign with a high risk score.

Advantageously, embodiments of the present disclosure can efficiently identify, investigate, and respond to security incidents at a large scale. By identifying email campaigns with multiple common attributes, a better understanding of the scope of a potential cyberattack can be used to prevent future attacks. Clustering emails together into one logical entity allows actions to be taken on a large scale across multiple tenants instead of at a granular level which can be a time-consuming and manually intensive process. The flexibility to visualize and explore campaigns at both a high-level and a granular level enables stakeholders to make effective decisions and security teams to investigate campaigns to mitigate any threats and avoid future harm.

Overview of Example Environments for Providing Malicious Activity Management Operations using a Security Maintenance Manager Aspects of the technical solution can be described by way of examples and with reference to FIGS. 1-12. FIGS. 1-12 are associated with an exemplary technical solution environment (malicious activity management environment or system 100) suitable for use in implementing embodiments of the technical solution. Generally, the technical solution environment includes a technical solution system suitable for providing malicious activity management operations based on a malicious activity manager. With initial reference to FIG. 1A, FIG. 1A discloses, among other engines, managers, generators, selectors, or components not shown (collectively referred to herein as "components"), malicious activity management environment 100, malicious activity management service 120, malicious activity manager 110 having activity instance and attribute sets 112, clustering instructions 114, scoring instructions 116, malicious activity models 118, multi-attribute cluster-identifiers 120, analysis instructions 130, visualization instructions 140, malicious activity management operations 150, malicious activity client 180 (including malicious activity management interface 182, and malicious activity management operations 184) and network 190.

The components of the malicious activity management system 100 may communicate with each other over one or more networks (e.g., public network or virtual private network "VPN") as shown with network 190. The network 190 may include, without limitation, one or more local area networks (LANs) and/or wide area networks (WANs). The graphics editing client 180 may be a client computing device that corresponds to the computing device described herein with reference to FIG. 7. Graphics editing system operations (e.g., graphics editing system operations 112 and graphics editing system operations 184) can be carried out by a processor executing instructions stored in memory as further described with reference to FIG. 17.

At a high level, the malicious activity manager 110 of a malicious activity management systems supports generating different multi-attribute cluster-identifiers having corresponding risk scores and attribute sets. Generating a multi-attribute cluster-identifier is based on clustering analysis and malicious activity determination models that support determining that an attribute set of an activity has a quantified risk (i.e., risk score) that indicates that the activity is a malicious activity. Generating the multi-attribute cluster-identifier for an activity (e.g., email campaign) can be based on initially clustering instances of the activity based on a corresponding attribute set (e.g., an attribute set of the emails in the email campaign).

The malicious activity manager 110 monitors a computing environment and analyzes an instance of an activity (e.g., an email) and based on matching the instance to a multi-attribute cluster-identifier (i.e., risk score and attribute set) that indicates activity is a malicious activity, identifies the instance of the activity as a malicious activity. In this way, a multi-attribute cluster-identifier corresponding to the type of malicious activity supports effectively identifying an instance of an activity that is processed in the computing environment as a malicious activity.

The malicious activity manager 110 further supports providing visualizations of malicious activity operations data. The visualizations are associated with different functions and features of the malicious activity manager (e.g., clustering analysis, risks scores, attribute sets, and evaluation results). The visualizations are provided to allow effective operation and control of the malicious activity manager from a user interface perspective, while the malicious activity manager simultaneously feeds back information in making decisions for malicious activity management.

Various terms and phrases are used herein to describe embodiments of the present invention. Some of the terms and phrases used herein are described here, but more details are included throughout the description.

An activity refers to a set of electronic messages that are communicated between computing devices. An activity includes the set of electronic messages that are stored as data in a machine. An instance of an activity can refer to an individual electronic message in the set of messages. An electronic message can have static data structure that facilitates processing the electronic message based on machine instructions with machine operations. Each instance of the activity includes machine instructions embedded in the individual instances of the activity to support executing machine operations.

An example activity may be an email campaign and an instance of the activity can refer to an email message. Campaign may be a cyberattack campaign (e.g., an email cyberattack campaign). Campaign can be an umbrella term associated with operations and computing objects (i.e., campaign objects) surrounding the management of an instance of a campaign.

Figure 1B:
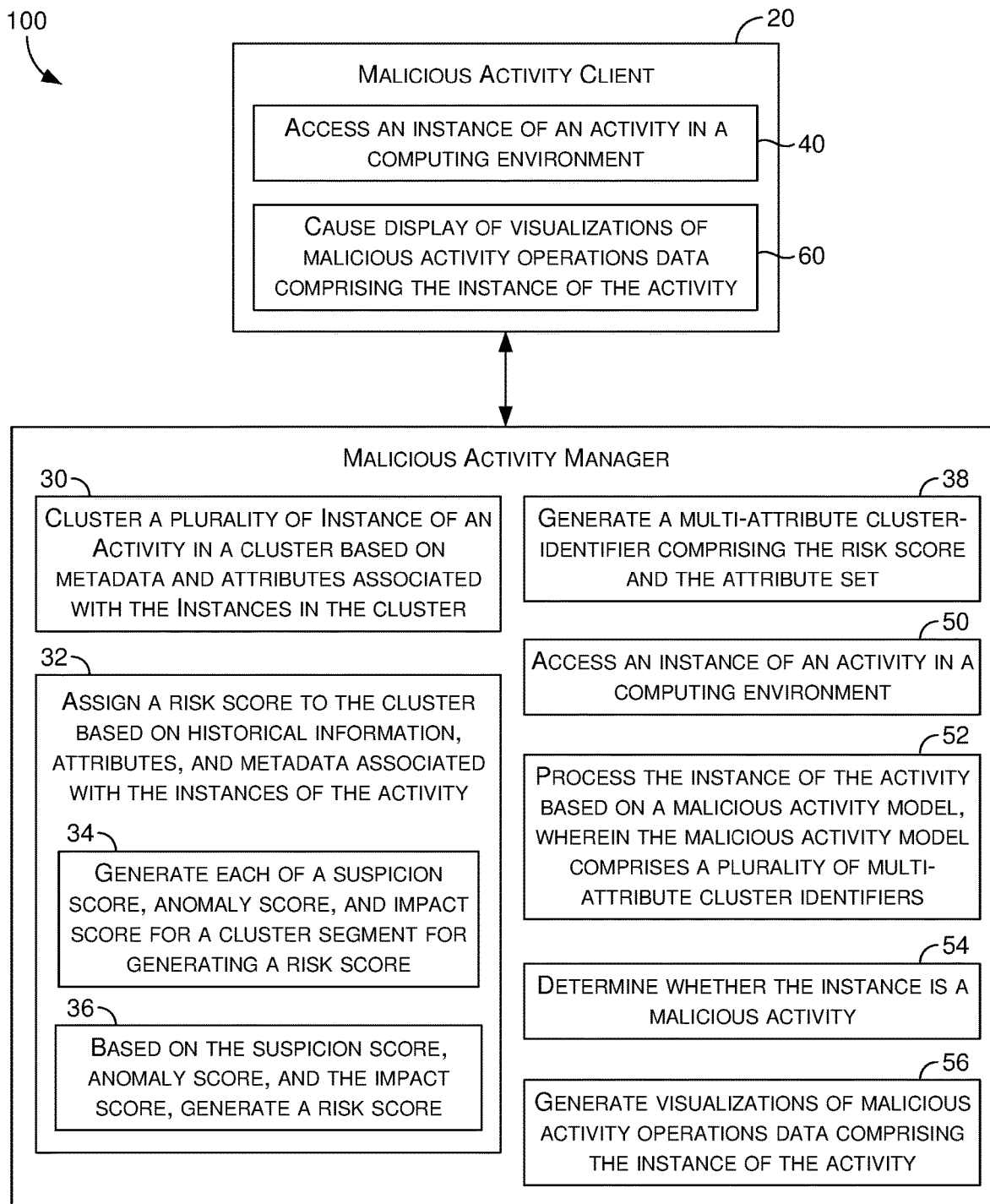
Figure 1C:
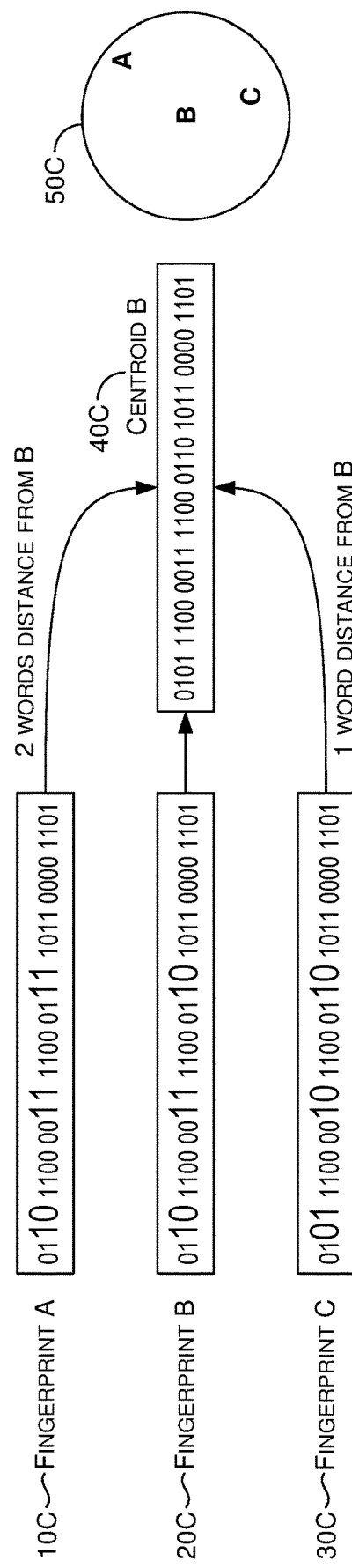

A fingerprints refers to a short binary representation of a document. The short binary presentation can potentially be for a longer document. The binary representation corresponds to a defined distance metric. In this way, documents which are similar will have a small distance. On example of a fingerprint is known as local sensitive hashing (LSH). With reference to FIG. 1C, FIG. 1C illustrates three different fingerprints (i.e., fingerprint A 10C, fingerprint B 20C, and fingerprint C 30C). Each fingerprint has a corresponding binary representation that is a distance metric that can be used to measure a similarity between the different fingerprints.

A centroid can refer to a cluster of fingerprints. In particular, centroids are clusters based off the fingerprints from the body of the email message. They are created by finding all fingerprints that have N2 bit words in common. For example, if the centroid allows for up to 32 bit words to be different these two would be in the same centroid as shown below:

FingerPrint 1: 0100 0011 1100 1101 0011 1010 0000 1011
FingerPrint 2: 0110 1011 1100 1001 0011 1010 0000 1011

Centroids can be generated for corresponding fingerprints. In particular, centroids can be efficiently generated to efficiently cluster fingerprints into existing centroid. As shown, in FIG. 1C, a centroid 40C can be generated from Fingerprint A 10C, Fingerprint B 20C, and Fingerprint C 30C. The centroid value itself is a fingerprint that is as close to as many fingerprints as possible. One technical implementation of generating centroids can be based on a daily basis. Generating centroids on a daily basis may result in the same fingerprint being on a different centroid value each day. As such, an alternative to calculating a new centroid continuously, a list of known centroids can be maintained. Then, a determination can be made if one or more fingerprints can be identified inside of the centroid. If the one or more fingerprints are identified inside of an existing centroid, then the fingerprint will be grouped into that centroids cluster. Fingerprints that are not inside the centroid will be processed to create new centroids.

Figure 1D:
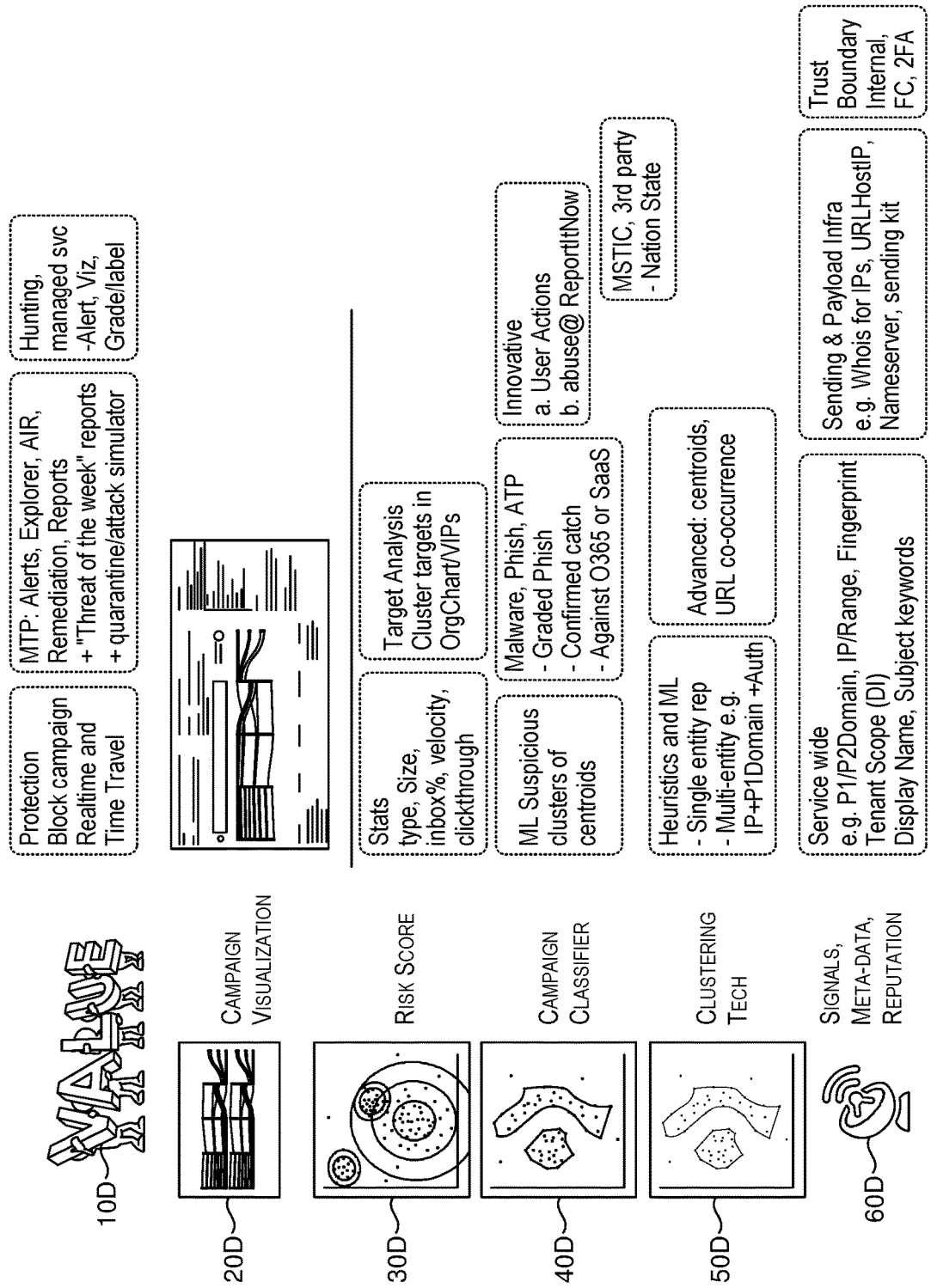

With reference to FIG. 1D, FIG. 1D illustrates a high level representation various operations and computing objects associated with a campaign. In particular, FIG. 1D includes value proposition 10D, campaign visualization 20D, risk score 30D, campaign classifier 40D, clustering tech 50D, and signals, meta-data, and reputation 60D. Campaign objects can support implementing the technical solution of the present disclosure, as discussed in more detail below. For example, a campaign can include value proposition (i.e., value 10D) that identifies the protection provided, alerts, remediation, and reports. Campaigns and campaign objects can also provide customers or administrators great insights in multiple aspects of cyberattacks experienced by users (i.e., campaign visualization 20D). Particularly valuable is the ability to cluster large volumes of individual emails (i.e., campaign classifier 40D and clustering tech 50D) that are often morphing over time in a variety of ways (email template, weaponized URL, sending infrastructure, etc.). Clustering can be based on email attributes (e.g., signals, meta-data, and sender reputation 60D). Campaign objects empower users to comprehend complex cyberattacks as they are summarized and represented in a visualized graphical user interface (GUI). Campaigns and campaign objects are used interchangeably herein, unless otherwise specified.

URL domains or simply domain refers to an identification string that defines a realm of administrative autonomy, authority, or control within the internet. URL domains names are used in various networking contexts and for application-specific naming and addressing purposes. The technical implementation of the present disclosure supports logging the domain of URLs that are provided to customers. URL domains can be associated with a sending IP address.

An Internet Protocol (IP) address is a numerical label assigned to each device connected to a computer network that uses the Internet Protocol for communication. As used herein, a sending IP address in an IP address that is connected to a primary server or set of servers responsible for managing emails that are sent from a URL domain of the primary server or set of servers.

With reference FIG. 1B, the malicious activity management system 100, malicious activity manager 10, and malicious activity client 20 correspond to the components described with reference to FIG. 1A. At step 30, a plurality instances of a potentially malicious activity (e.g., a plurality of email messages) are clustered based on metadata and attributes associated with the instances (e.g., email messages) in the cluster. The malicious activity management system (e.g., malicious activity manager 10) identifies campaigns through a series of steps. The malicious activity manager 10 identifies emails that are part of the same campaign. Multiple attributes of emails are used to link a campaign together. Clustering can be based on identifying centroids and identifying centroids with associated metadata attributes of the clustered email messages, the centroids are calculated based on the fingerprints of the email messages, and identifying common metadata attributes among the email messages. Clustering can further be based on applying filters based on the common metadata attributes, where applying filters based on the common metadata attributes identifies two of more subsets of the email messages, and generating campaign guides associated with each of the two or more subsets of the plurality of email messages, where a campaign guide links to the common metadata attributes corresponding to a subset of the plurality of email messages.

At step 32, a risk score is assigned a cluster based on historical information, attributes, and metadata associated with messages in the cluster. The risk score can be based on suspicion score, anomaly score, and impact score. As such, at step 34, a suspicion score, an anomaly score, and an impact score are generated for a cluster segment; and at step 36, the suspicion score, the anomaly score, and the impact score are used to generate the risk score. The suspicion score is based on information about a tenant of the computing environment; the anomaly score is based on information regarding the sender of information; and the impact score is based on a position of individuals targeted by instances of the activity in a corresponding cluster, classification of content in the corresponding cluster, and website information included in the previous instances of the activity.

At step 38, the multi-attribute client-identifier is generated, with the multi-attribute cluster-identifier includes a risk score and the attribute set. At step 40, an instance of an activity is received in a computing environment. At step 50, the instance of the activity is received at the malicious activity manager. At step 52, the instance of the activity is processed based on a malicious activity model. Processing the instance of the activity is performed using a malicious activity model. The malicious activity model includes a plurality of multi-attribute cluster-identifiers associated with previous instances of the activity. The multi-attribute cluster-identifiers include corresponding risk scores and attribute sets, where the risk scores and the attribute sets indicate a likelihood that the instance of the activity is a malicious activity. The malicious activity model is a machine learning model that is generated based on processing a plurality of email messages associated with a plurality cyberattacks. The processing the plurality of emails messages is based on clustering the plurality of emails based on action taken by recipients of the plurality of emails, attachments in the email, and corresponding fingerprints of the plurality of emails. The malicious activity model is configurable for processing the plurality of email messages at a tenant level, a global level, or a combined tenant-global level.

At step 54, a determination whether the instance of the activity is a malicious activity. Determining whether the instance of the activity is a malicious activity is based on comparing the attribute set of the instance of the activity to the plurality of multi-attribute cluster-identifiers, where the attribute set of the instance of the activity matches an attribute set of at least one of the plurality of multi-attribute cluster-identifiers. A risk score and the attribute set of the at least one of the plurality of multi-attribute cluster-identifier indicate a likelihood that the instance of the activity is a malicious activity.

At step 56, visualization of malicious activity operations data are generated and communicated to the malicious activity client 20. The malicious activity operations data is selected from each of clustering analysis, risks scores, attribute sets, evaluation results for generating corresponding clustering analysis visualizations, risk scores visualization, attributes set visualization and evaluation results visualizations. Based on determining that the attribute set of the instance of the activity corresponds to the risk score and attribute set of at least one of the plurality of multi-attribute cluster-identifiers that indicate a likelihood that the instance of the activity is a malicious activity, executing one or more remediation actions. The one or more remediation actions are executed based on the severity of the risk score, wherein the risk score value corresponds to one of the following: high, medium, or low. At step 42, visualizations of malicious activity operations data having the instance of the activity are received and caused to be displayed.

Figure 2:
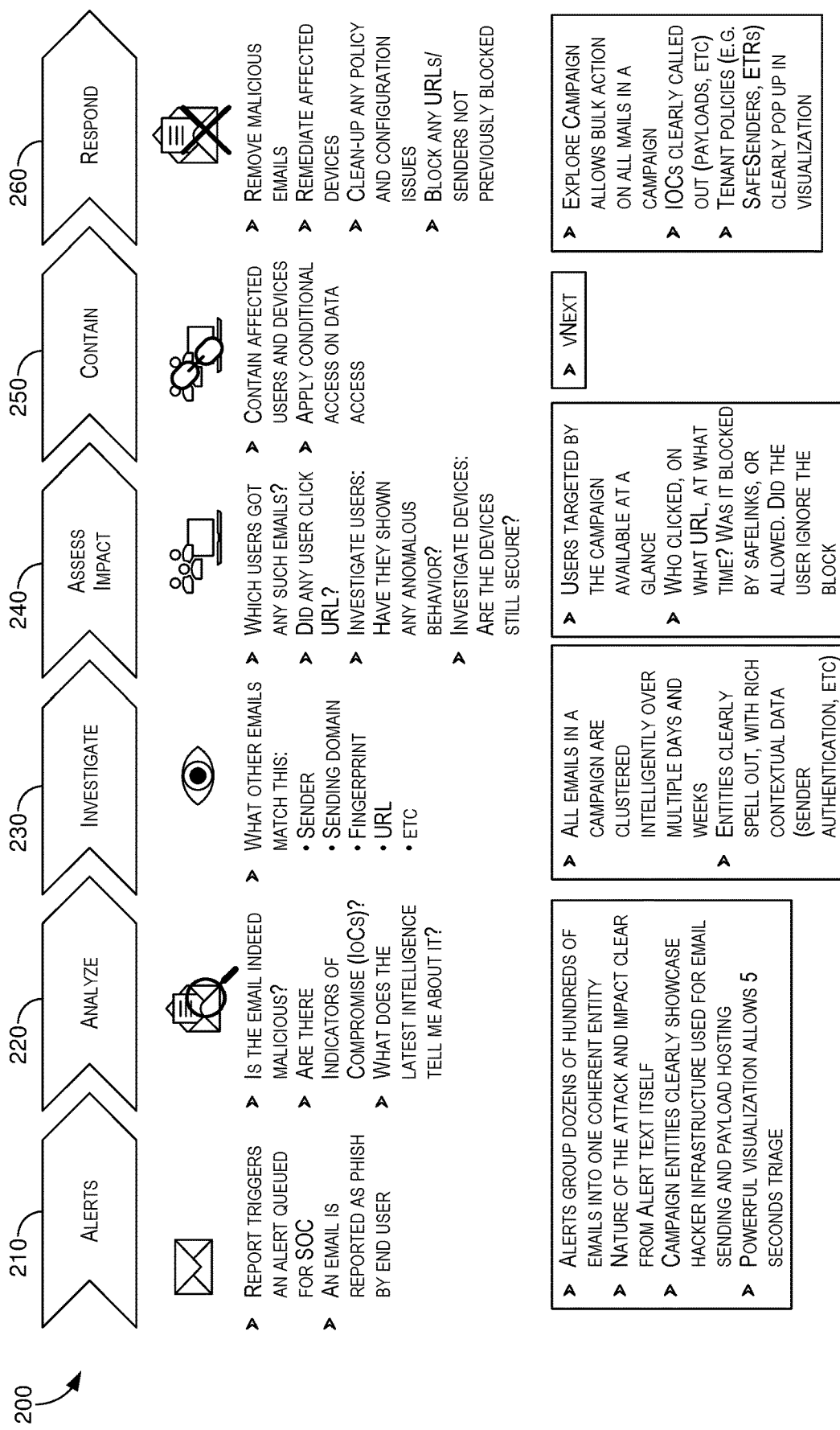
FIG. 2 is an example malicious activity management environment for providing malicious activity management operations, in accordance with aspects of the technology described herein.

With reference to FIG. 2, FIG. illustrate different stages of malicious activity management operations that support identifying malicious activity in computing environments. The stages include Alerts 210, analyze 220, investigate 230, assess impact 240, contain 250, and respond 260. During the alerts 210 stage, a report can be triggered and queued with a security operations center (SOC), or an email can be reported as a phishing email by an end user. Operationally, alerts group dozens of hundreds of emails into one coherent entity. The nature of the attack and the impact can be determined from the alert text itself. Campaign entities can showcase hacker infrastructure used from email sending and payload hosting. Alerts can be visualized using visualization tools. At the alert stage, a determination can be made if an email is malicious. For example, are there any indicators of compromise (IOC), and what does the latest intelligence indicate about the email.

At the investigate stage 230, a determination is made about other emails that match the identified emails. The determination can be made based on email attributes (e.g., sender, sending domain, fingerprint, URL, etc.). As discussed, all emails in a campaign are clustered intelligently over multiple days and weeks. Campaign entities indicate rich context data for matching the email to a cluster. At the assess impact stage 240, a determination is made as to the extent of the impact. For example, which users got such emails, did any user click a malicious URL, investigate users and their devices. Users targeted by a campaign can be made available at a glance, along with who clicked on what URLs, at what time, was the URL blocked or allowed, etc. At the contain stage 250, actions are performed to contain affected users and device and apply conditional access to data by the users and devices. And, at response stage 250, malicious emails can be removed, clean-up operations and policy configuration operations performed, any URLs and unblocked senders can be blocked. Visualizations at this stage can support exploring campaigns, performing bulk actions on all emails in a campaign, identifying indicators of compromise, and identifying tenant policies.

Figure 3:
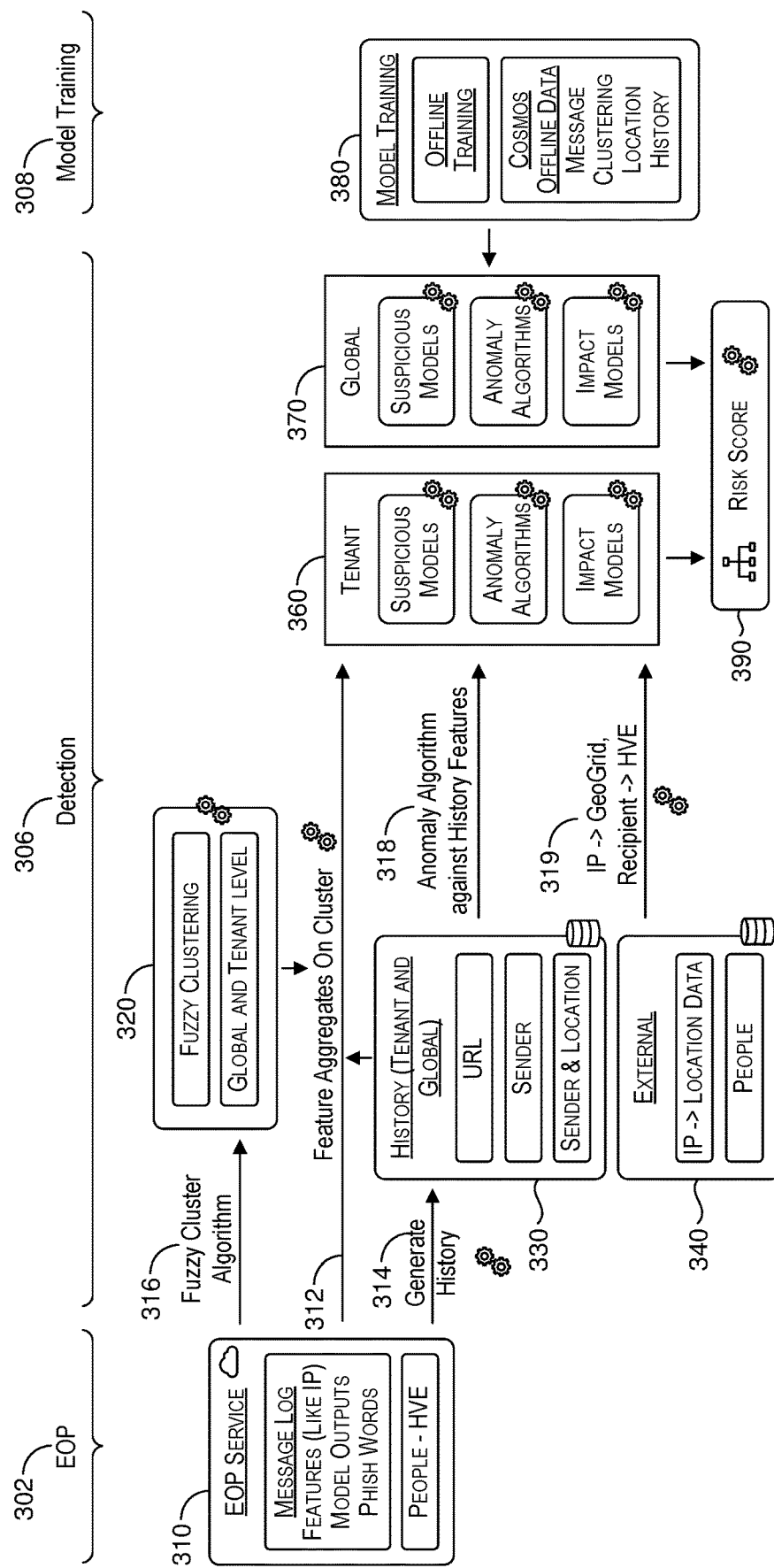
FIG. 3 is an example illustration of malicious activity management processing data for providing malicious activity management operations, in accordance with aspects of the technology described herein.

With reference to FIG. 3, FIG. 3 illustrates a flow diagram and components that support providing malicious activity management operations for identifying malicious activity in computing environments. FIG. 3 includes the following stages: email online protection ("EOP") 302, detection 306, and model training 308; and services: EOP service 310, clustering 320, history 330, external 340, tenant 360, global 370, model training 380, and risk score 390. An EOP can refer to a hosted e-mail securing service that filters spam and removes viruses from emails. The EOP can operate to analyze message logs and extract phish words relative to people (e.g., high value employees HVE) associated with the email messages. Message data from the EOP can be used to aggregate features on clusters of emails messages 314 based on generating history 314 and utilizing fuzzy cluster algorithms 316. Generating history can be based on the message data that includes URLs, senders, sender and location combinations for particular tenants and globally as well. As discussed herein in more detail, the aggregate features from clusters, anomaly algorithms 318, IP and recipient data 319, are processed through machine learning models (e.g., tenant models and global models) trained via model training 380 to generate the risk score 390.

Figure 4:
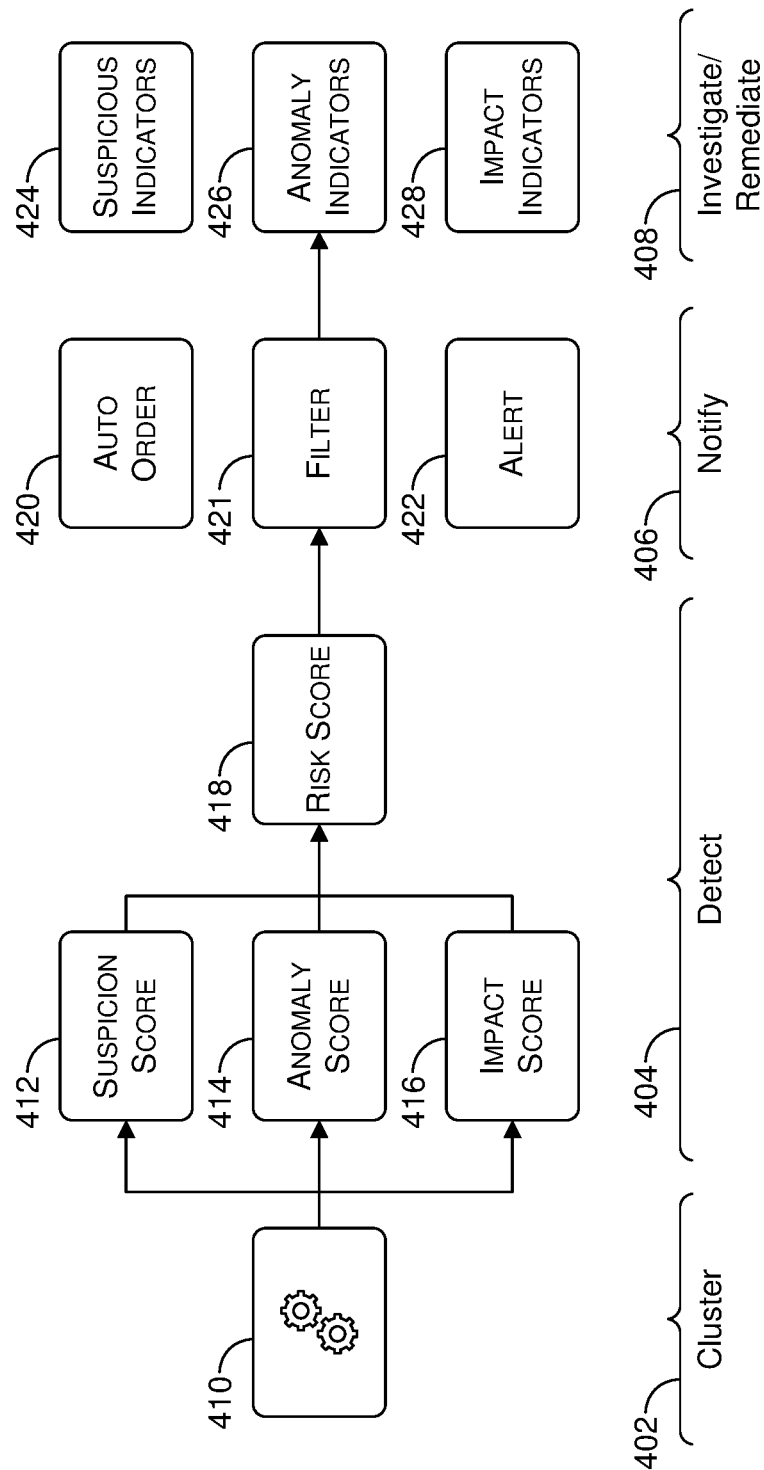
FIG. 4 is an example illustration of malicious activity management processing data for providing malicious activity management operations, in accordance with aspects of the technology described herein.

With reference to FIG. 4, FIG. 4 provides an alternative view of a flow diagram and components that support malicious activity management operations for identifying malicious activity in computing environments. FIG. 4 includes the following stages: cluster 402, detect 404, notify 406, and investigate remediate 408. Upon clustering 402, as described herein, a risk score 418 can be generated based on a suspicion score, an anomaly score, and an impact score. The risk score can be used during a notification phase (i.e., notify 406) for alerts (e.g., alert 422) and automatic orders (e.g., auto order 420). The notify 406 can further include filtering risk score for corresponding emails based on anomaly indicators, suspicious indicators, and impact indicators during an investigate and remediate phase.

Turning to generating fingerprints that support clustering, as an initial matter, conventional systems use only fingerprints based on the content of the mail. Using fingerprint exclusively can yield many FP/FNs (false positives: incorrect positive prediction/false negatives: incorrect negative predictions) because legitimate mail can have the same fingerprint as a malicious email when an attacker is trying to impersonate a legitimate sender. It is contemplated that an email message (i.e., an instance) of an email campaign (i.e., activity) is used herein as an example instance of an activity; however, this is not meant to be limiting, as embodiments described can be applied to different types of activities and corresponding instances.

The malicious activity management system 100 can specifically utilize campaign graph clustering techniques based on campaign guides and metadata. Using the campaign graph clustering technique, for each campaign that is discovered, a campaign guide. The campaign guides will then link to the metadata properties that are a part of the campaign. A campaign is generated based on linking together metadata values and apply filters as each step to reduce false positives.

The malicious activity management system 100 can also implement full fuzzy clustering techniques. For example, LSH fingerprints can be generated based on the text of an email, excluding URLs and HTML structure. These fingerprints are similar to a hash function but the distance is close between messages that have similar content. Full fuzzy clustering enables running daily aggregations. The clustering operations on a given number of messages can be completed based on a defined period of time (e.g., 300 million messages daily and can take about 2 hours to complete). In this way, by way of example, approximately 500 thousand clusters can be output daily out of 5 million possible clusters.

Figure 5:
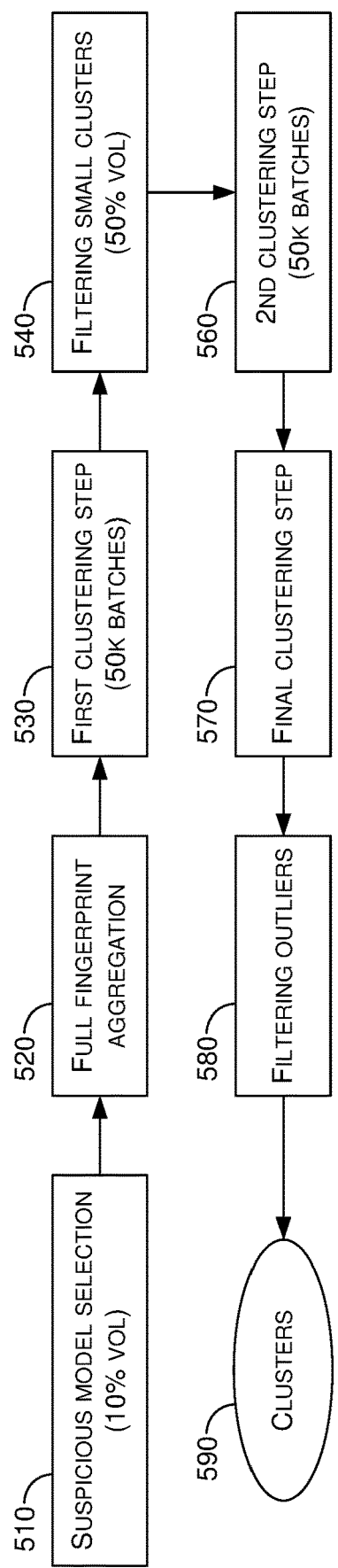
FIG. 5 is an example illustration of malicious activity management processing data for providing malicious activity management operations, in accordance with aspects of the technology described herein.

As shown in FIG. 5, at step 510 a selected volume of instances of an activity (e.g., 10%) can be selected based on a suspicious model selection (e.g., selecting a set of suspicious instances of an activity). At step 520, fingerprints can be generated for the instances. At step 530, a first clustering step can be performed for a subset of the instances (e.g., 50 k batches). At step 540, smaller clusters (e.g., 50% vol) are filtered. At step 560, a second clustering step can be performed on the instances (e.g., 50 k batches). At step 570, a final clustering step is performed. At step 580, outlier clusters are filtered to generate clusters 590.

Figure 6:
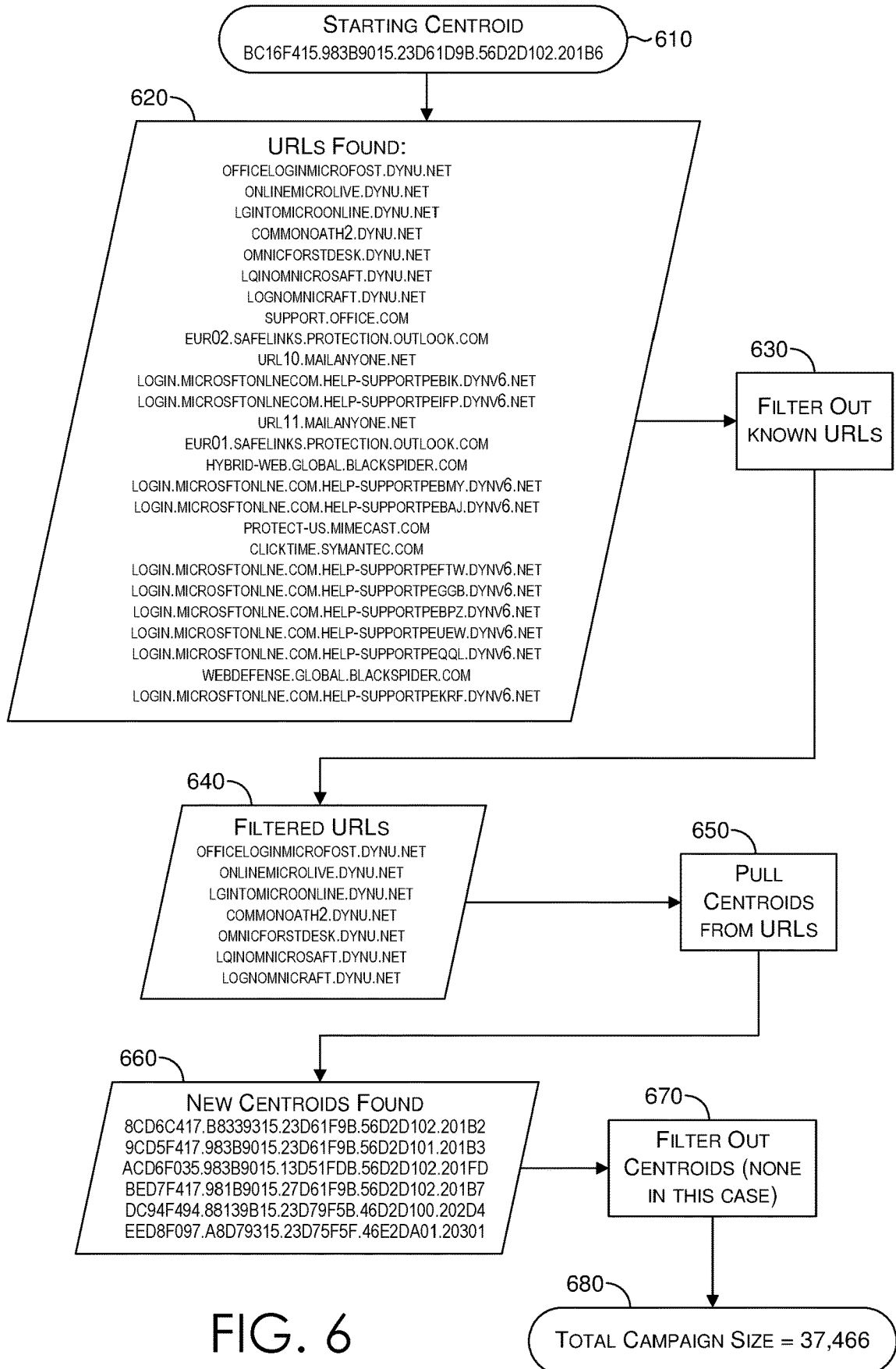
FIG. 6 is an example illustration of malicious activity management processing data for providing malicious activity management operations, in accordance with aspects of the technology described herein.

With reference to FIG. 6, FIG. 6 illustrates a flow diagram for generating a cluster based of centroid and URL. At step 610, a starting centroid is identified, the starting centroid is BCaa16F415.983B9015.23D61D9B.56D2D102.201B6. As discussed, a centroid can refer to a cluster of fingerprints. In particular, centroids are clusters based off the fingerprints from the body of the email message. They are created by finding all fingerprints that have N 2 bit words in common. At step 620, a plurality of URLs associated with centroid are identified. At step 630, a plurality of known URLs are filtered out of the URLs found in step 620. At step 640, a set of filtered URLs are identified. At step 650, the filtered URLs are used to identify new centroids. At step 660, the new centroids are identified. At step 670, centroids (e.g., known centroids) are filtered out of the new centroids. At step 680, a set of instances (e.g., 37,466 messages) associated with the new centroids are identified.

Figure 7:
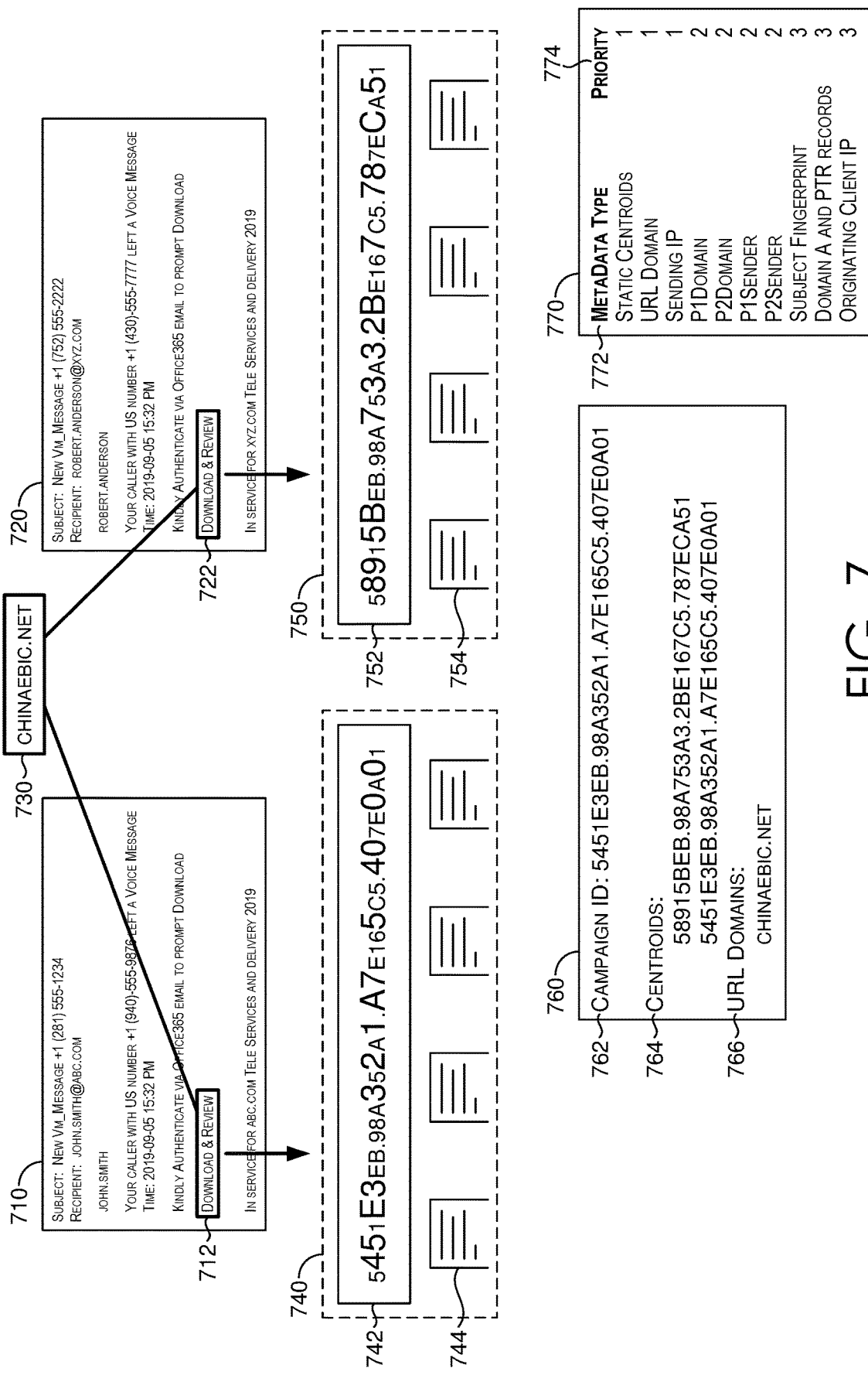
FIG. 7 is an example illustration of malicious activity management processing data for providing malicious activity management operations, in accordance with aspects of the technology described herein.

With reference to FIG. 7, FIG. 7 illustrated generating campaigns based on identifying multiple common metadata attributes. By way of example, a first email 710 may include a first detected URL 712 and a second email 720 can include a second detected URL 722. It can be determined that both the first URL 712 and the second URL 722 are the same (i.e., chinabic.net 730). The first email can have a first centroid 740 and the second email can have a second centroid 750. Several different metadata types can be identified and assigned priority for utilizing the metadata types (e.g., common attributes 770, metadata type 772, and priority 774) for generating campaigns. For example, metadata types include static centroids, URL domains, sending IP, domains, sender, subject fingerprint, originating client IP etc. each associated with a corresponding priority. A campaign (e.g., campaign 760 with campaign ID 762, centroids 764, and URL domain) can be generated associated with the first email and the second email. Advantageously, if one email sent to MS CEO and it was phish/spam that was missed by the current systems. The content of the email was slightly different for different users. So there are similarity metrics that were sent by same person which lead to other attributes. So based on one message, embodiments of the present invention extrapolated out and were able to figure out that about 4500 messages in the campaign were potentially malicious. To accomplish this, embodiments of the present invention emails can be chosen wisely using clustering techniques to generalize and capture and what is anomalous.

Turning to FIG. 8, FIG. 8 illustrates a grid of attributes that can be utilized for clustering emails. In particular, the malicious activity management operations include support for intelligently selecting attributes by tracking the reputation using a variety of services and attributes. Tracking of reputation can be for entities that are known. For each entity, the reputation is checked across multiple attributes and expand the cluster in that dimension. For example, it would be very suspicious to have 4500 of mails that sent a URL that never has been sent before and are reaching for emails from so many different companies and directed to high value employees (HVEs).

The malicious activity management operations further support discerning malicious emails from legitimate emails. In some cases, there are users reporting issues. In other cases, there are analysts who look at emails coming in to view the emails and investigate. Embodiments of the present invention may use a machine learning model to analyze all of these features of the email cluster to determine if the emails are suspicious or not. For example, look at the number of executives the email was sent to. Extract features from the email, and historical data (user actions), and a bunch of others. A machine learning model can be generated to classify whether the received cluster is malicious or legitimate. Then have additional logic to determine if the cluster is a mixed cluster because a malicious message does not mean the whole message is bad. It is contemplated that various ways of grouping/clustering emails messages according to attributes can be implemented. For example, by content similarity (e.g., fingerprinting using locality-sensitive hashing (LSH)).

With reference to additional clustering techniques, clustering deals with operations that group/cluster emails in a way that actually enables embodiments of the present invention to tell apart different emails and also enables embodiments of the present invention to tell how emails are similar even at different time periods. Cluster further contemplates how maintaining this information is performed (e.g., how the clusters/groupings are maintained). And, given the scale of clustering contemplated, a determination can be made if a cluster is malicious (e.g., spam, phishing, malware, etc.) using various attributes or signals. A machine learning model can be used to determine that a cluster is malicious. And, visualization techniques can be implemented to relay, display, show, or otherwise demonstrate to a user various aspects of a potential attack in an email campaign (e.g., show that an attack that has thousands of emails coming from different places and going to different places). Because of the scale of email is large, operations described herein are further able to see campaigns at a global scale across many tenants and customers. As such, embodiments of the present invention can build a campaign because of the vast amount of data accessible by embodiments of the present invention.

As discussed, the risk score can be based several different scores. The scores may be used to determine an overall risk score for an associated email campaign. Each score calculation may be made using an associated model. One such score calculation is a suspicion score. It may be generated at the tenant and global level. Features include engine information aggregation such as how many caught by which subsystem, model scores and other subsystem results, historical data: contact graph features with P2 sender and URL hosts for example. Training aspects of the suspicion model include bad labels such as clusters which contain at least one phish/malware manual grade (vendor or analyst), good labels such as clusters which contains at least one good manual grade or one good label AND does not have any bad manual grade. The model can be any conceivable/suitable model for generating a suspicion score based on attributes (e.g., example features in FIG. 9) of an email. For example, a tree ensemble comprised of 4 boosted trees with different length, 1 linear regression. Below is an example of features considered by a suspicion model.

Another score is an anomaly score. Anomaly features include a new sender to a tenant, a new link host to a tenant, an old sender to a tenant form a new location and a new link to a tenant, and many others. An anomaly score can be calculated using any suitable model, algorithm, process, or method such as a simple heuristic. The model may use history data at a tenant and global level to generate an anomaly score. History may be defined as a closed period time (e.g., 6 months). Frequency of update can be daily. History data is defined at tenant level. Example types of history data include, but are not limited to: history of sender (e.g., the ideal address format would be P1+P2, even better; "raw from header+P1 address"), history of geo location (e.g., geo grid that is calculated from latitude/longitude, both client IP and connecting IP addresses), history of link host. Features include age of relationship, number of days seen, total number of messages (tenant/global), and total number of bad messages (tenant/global), among others.

An impact score can also be calculated. For example, one impact score may be calculated for high value employees (HVEs). An impact score model may use email communication patterns to construct graphs of user with consistent emails communications. For example, given the CEO as a seed, the distance to other user along the graphs is equivalent to the importance of the users. Another impact score that may be calculated based on content classification. For example, embodiments of the present invention may use a machine learning model or any other suitable model which is based o/analyzes/uses a hashed subject and body tokens as well as structural features to identify messages asking for credentials. In some embodiments, the model is trained on messages marked as brand impersonation by graders and good messages from the corpus heuristic which are unlikely to be credential seeking. Yet another impact score that may be calculated by embodiments of the present invention is based on website impact signals. For example, embodiments of the present invention may use a model (machine learning or otherwise) to determine if a website included in emails associated with a campaign include a form entry, a form for collecting a password, or if the website brands looks like a proprietary brand (e.g., Office365).

The malicious activity management operation further enable certain actions to be taken on campaign based on the overall risk score or suspiciousness level of a campaign. Based on the suspiciousness of campaigns actions can be taken. The actions include any of the following: campaign pattern blocked so future instances are no longer reaching the user base; prioritizing alerts that can be triggered so security processes and personnel are able to quickly remediate issues, before victims are handing over their enterprise credentials or installing malware on their devices; campaign can be understood in detail, with good flow diagrams, to determine the set of IOCs (indicators of compromise) that were used across the attack. These IOCs can be checked/inputted in other security products; and campaign write-ups can be automatically generated to describe, in plain English and with nice charts, the origin, timeline, intent, and appearance of the attack. Then how well each aspect of the filtering solution protected or failed to protect. Then which users or devices where targeted and which of them fell victim (see below for further description describing the generation of campaign write-ups.

With reference to FIGS. 10A-10C and 11A-11C, example dashboard having different types of visualization are provided. The malicious activity management operations further support generating visualizations of malicious activity management operations data. The visualizations can be associated with generating a campaign write-up, report, summary, and/or any other information that can be transmitted to any number of tenants, customers, or other users. These write-ups, reports, summaries, and/or any other information can be generated by automatically to show what the campaign looks like a high-level but also allow for granular views of certain data/attributes associated with the campaign. "Campaign Write-ups" may be generated as a user editable document that describes, in plain English (localized of course) and data, charts, graphs, an attack write-up. The user editable documents are generated based on attributes and information associated with an email campaign. This is advantageous because write-ups regarding malicious email messages or activities are a common activity of cybersecurity where blog posts are often used to describe, in detail, various aspects of a malicious attack. Traditional security services provide customers a stream of attacks that have been targeting them.

Figure 10A:
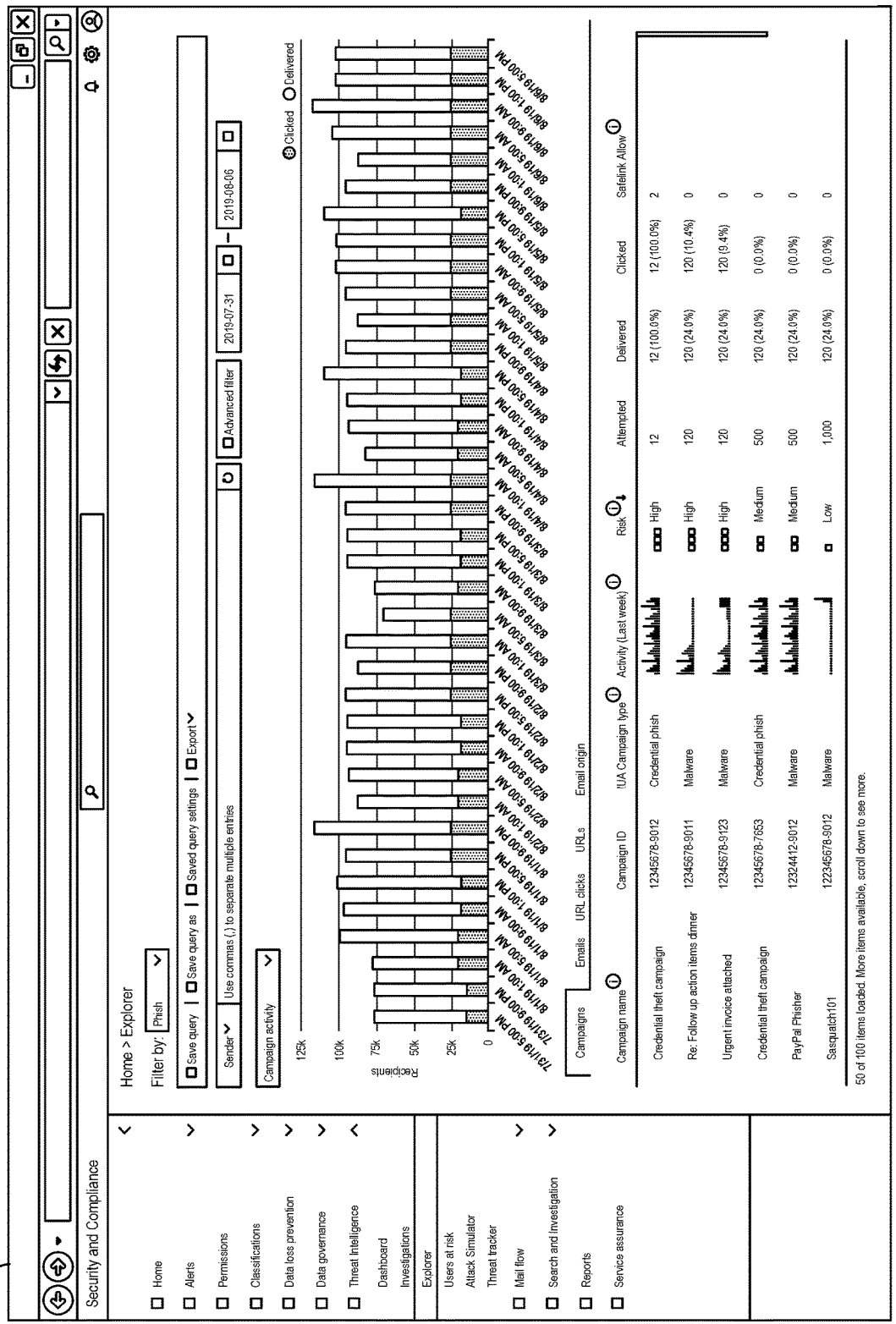
FIGS. 10A-10C are illustrations of malicious activity management processing data for providing malicious activity management operations, in accordance with aspects of the technology described herein.
Figure 10B:
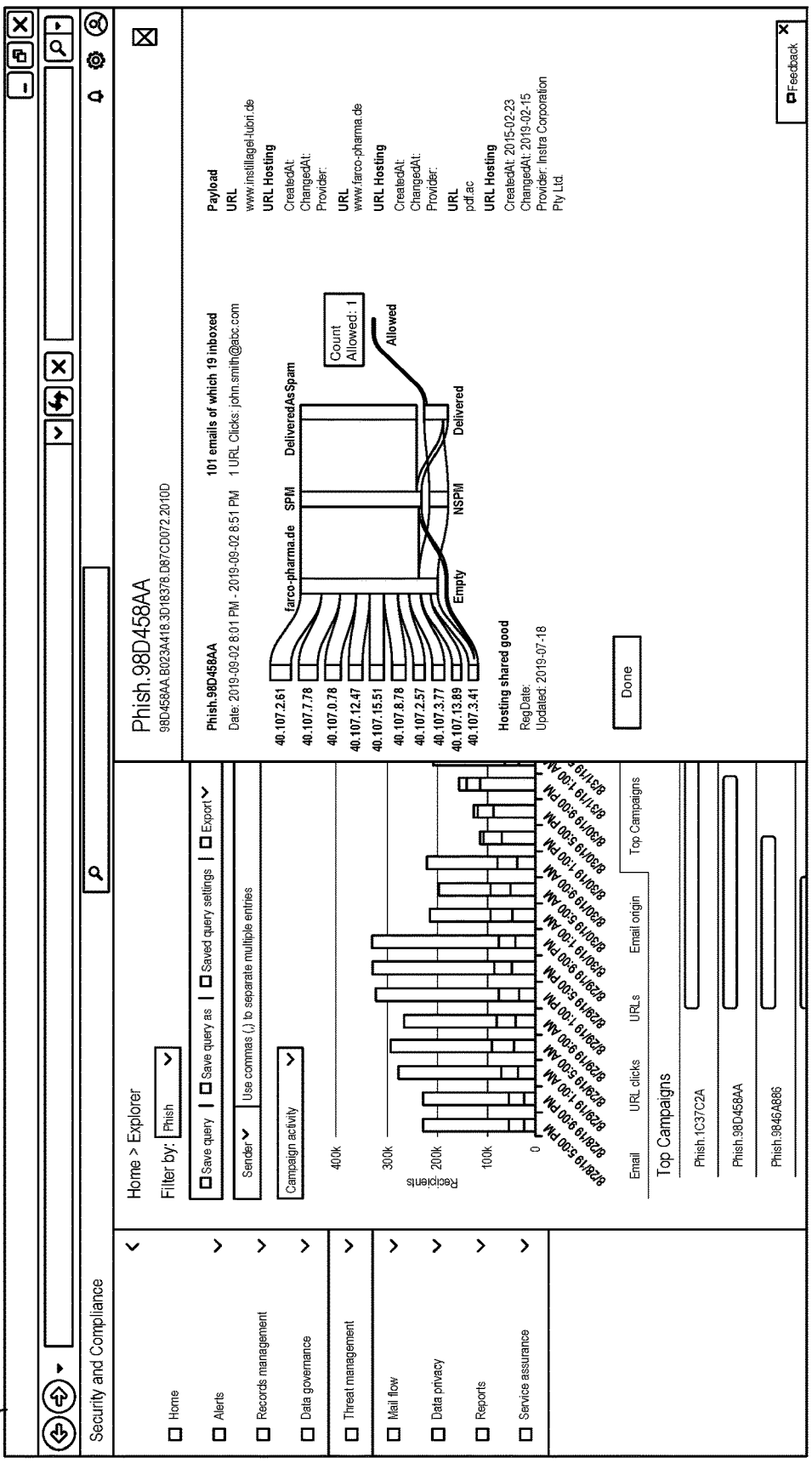
Figure 10C:
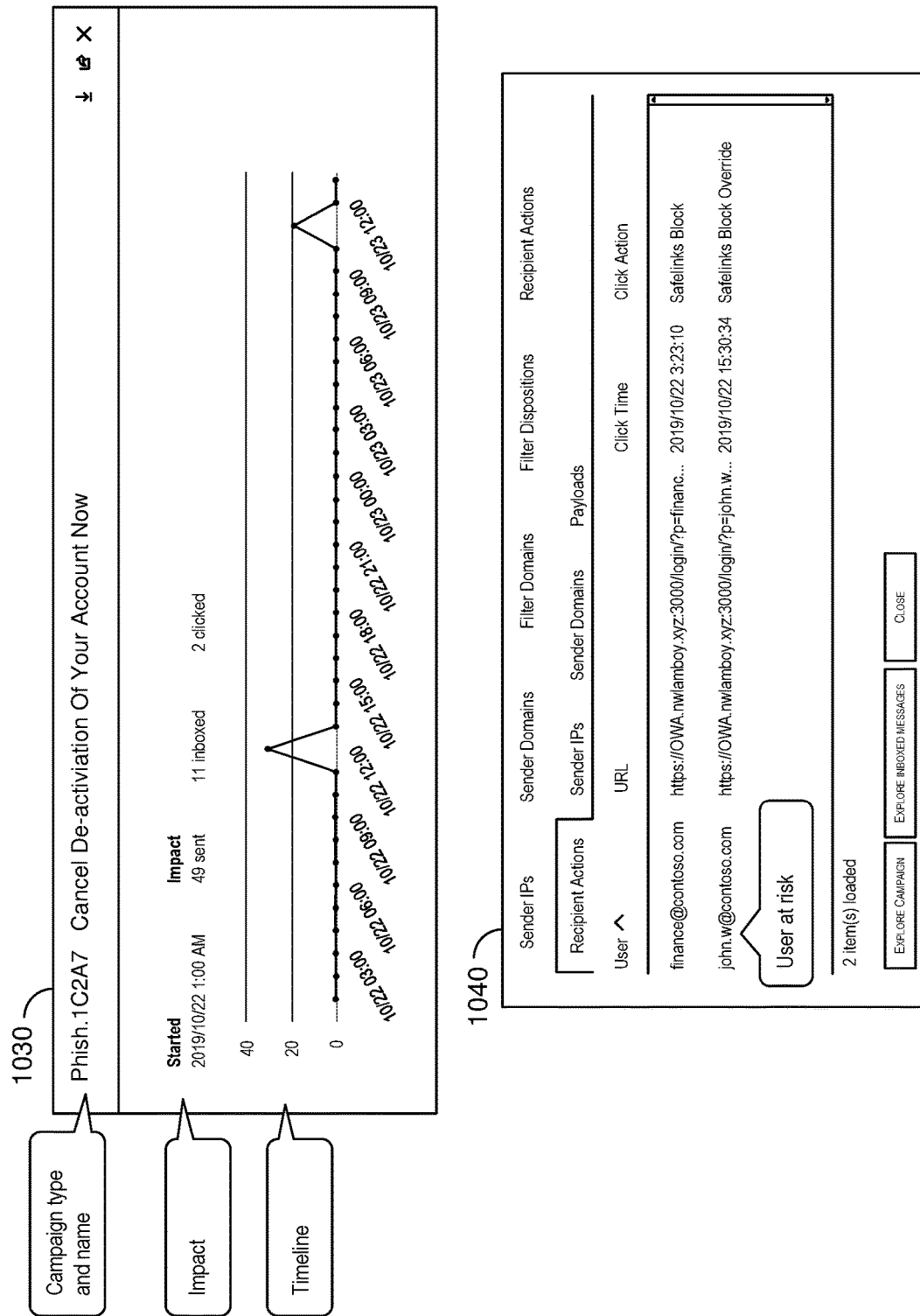

In FIG. 10A, dashboard 1010 includes a configurable interface for view malicious activity operations data (e.g., alert permissions, classifications, data loss prevention, data governance, threat prevention). As shown, a chart identifying a total number of delivered emails and a total number of clicked email can be generated. The malicious activity operation data can be view based on different selectable tabs (e.g., campaigns, emails, URL clicks, URLs, and email origin). Additional filters available via the interface can include campaign name, campaign ID, etc. As shown in FIG. 10B, dashboard 1020 can illustrate the details of a particular campaign. For example, Phish.98D458AA campaign can have an interface element that identifies IP addresses associated with the campaign and a number of emails allowed for that campaign. Additional attributes of the campaign are also readily available from the campaign visualization. In FIG. 10C, even more granular details of campaign are illustrated in dashboard 1030 including the campaign type and campaign name, impact data, and timeline data. As shown in dashboard 1040, at risk user can be readily identified along with relevant attributes including recipient actions, sender IPs, sender domains, and payloads.

Figure 11A:
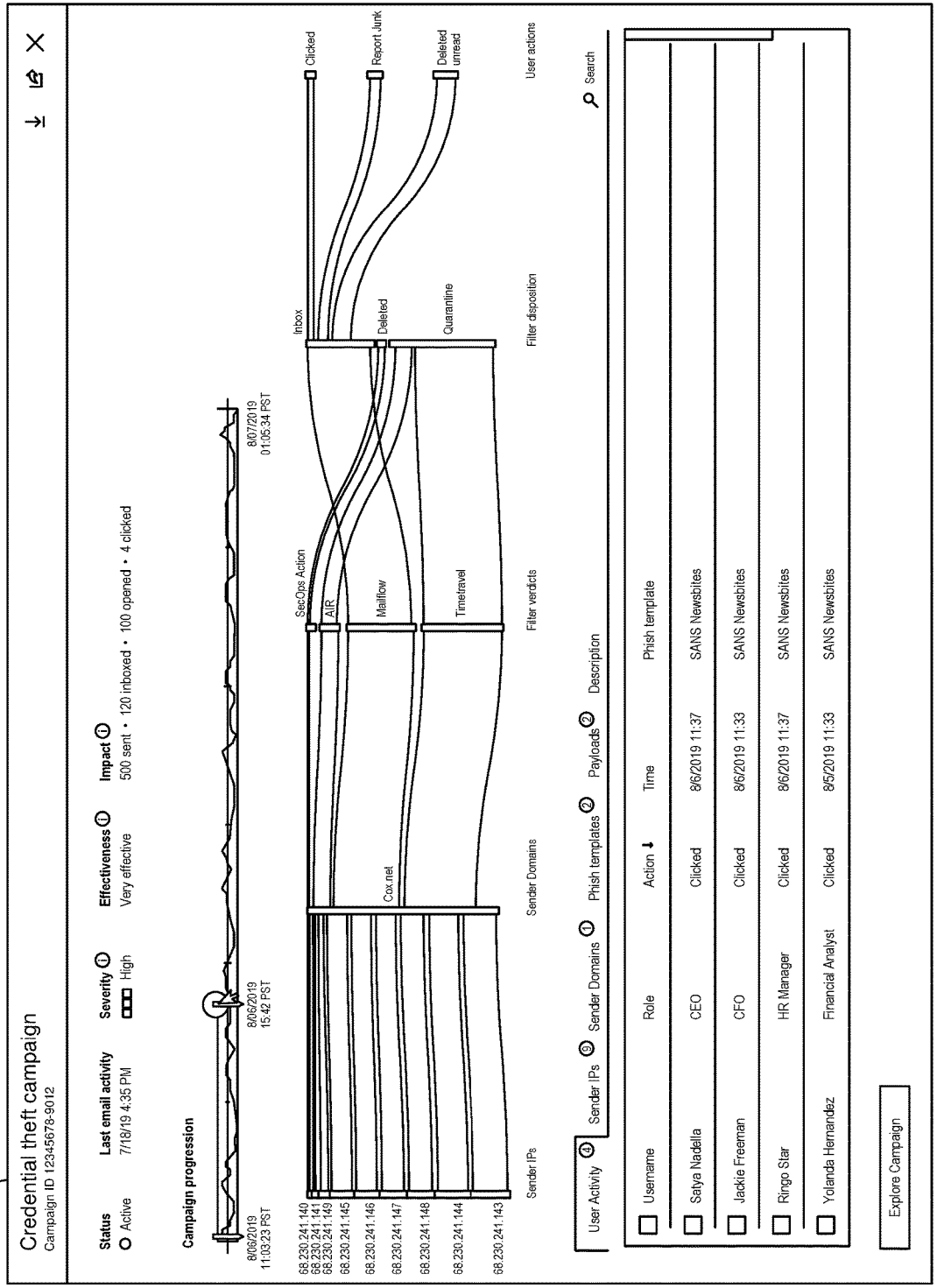
FIGS. 11A-11B are illustrations of malicious activity management processing data for providing malicious activity management operations, in accordance with aspects of the technology described herein.
Figure 11B:
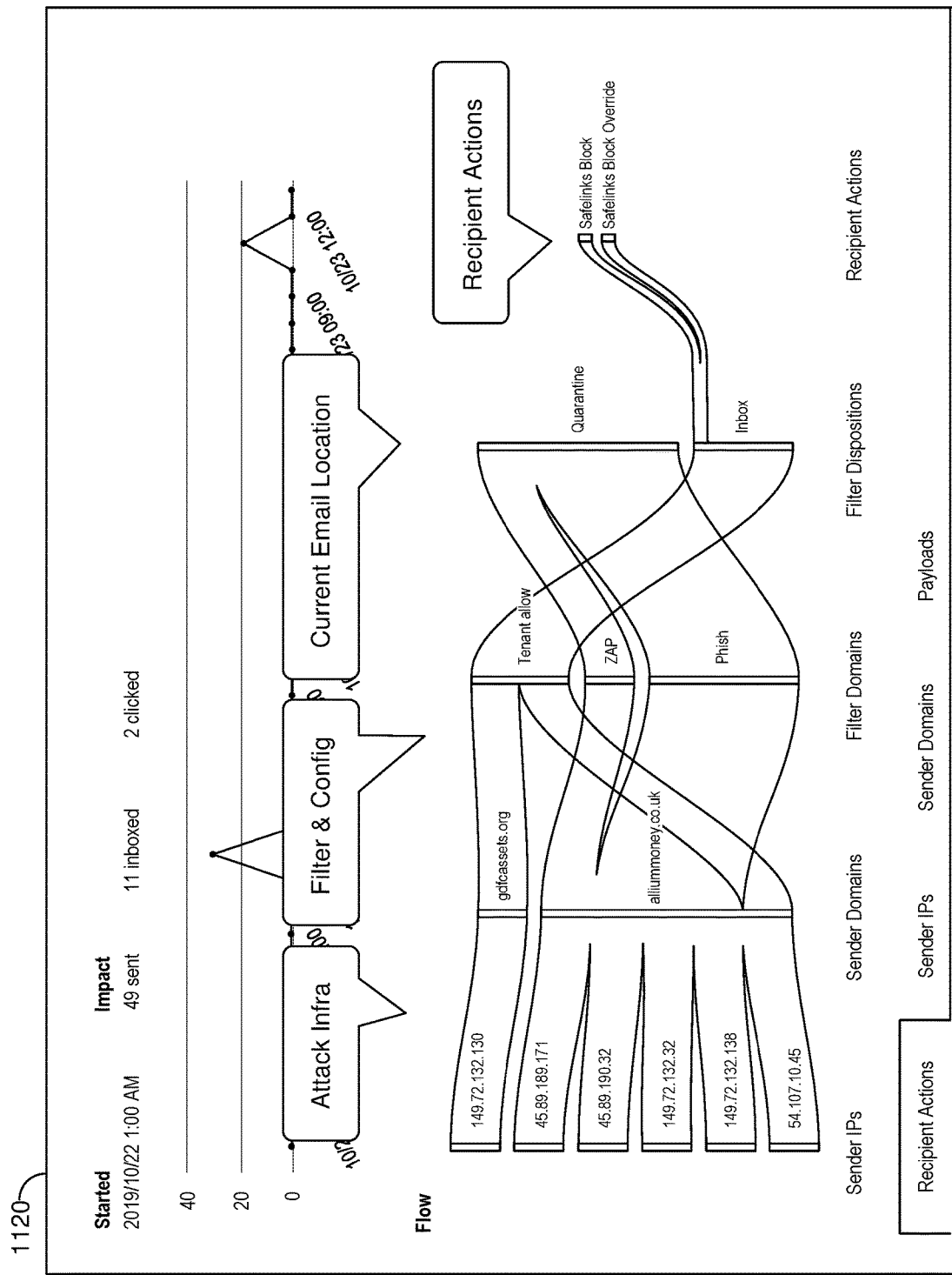
Figure 12:
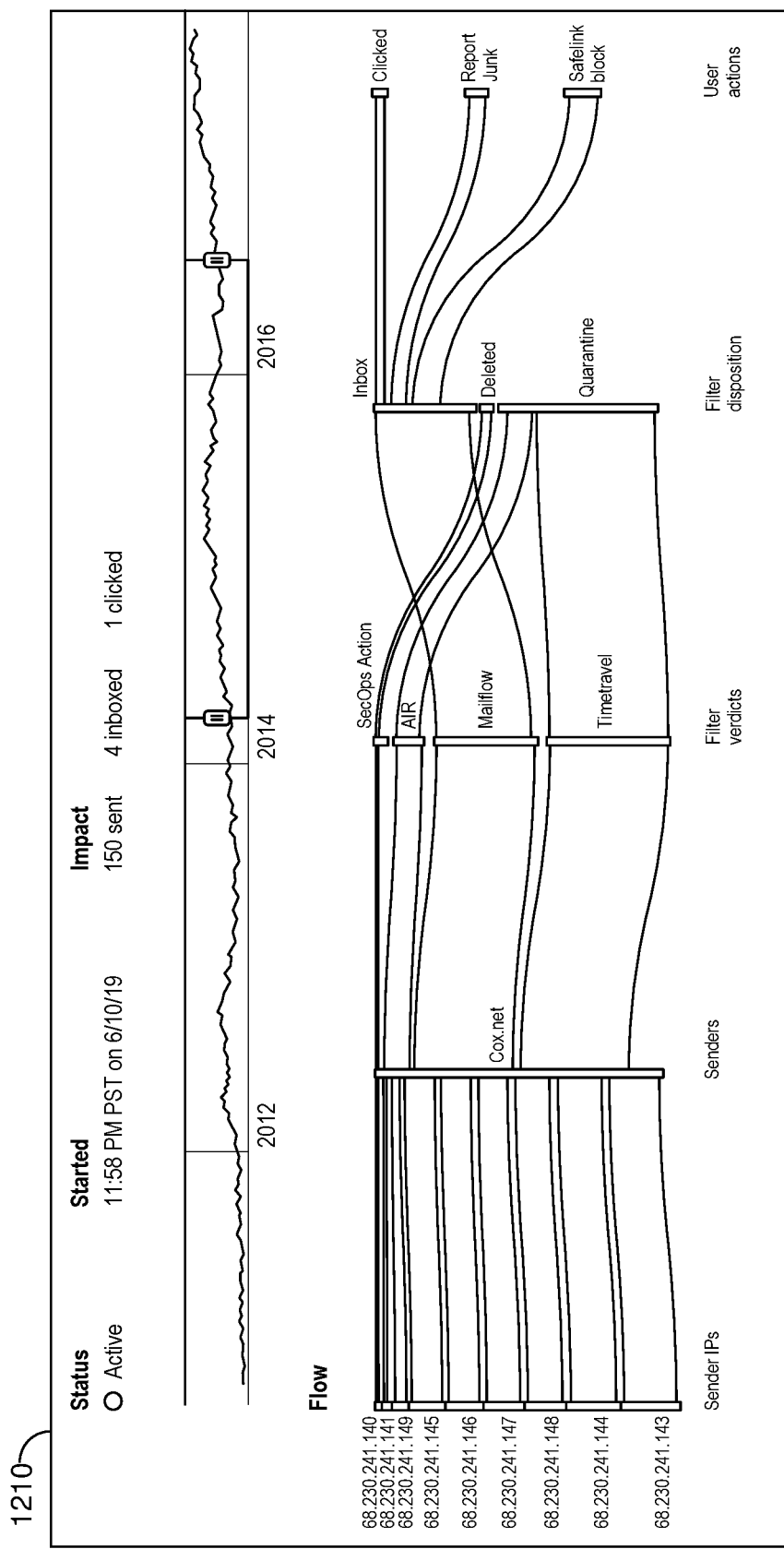
FIG. 12 is an illustration of malicious activity management processing data for providing malicious activity management operations, in accordance with aspects of the technology described herein.

In FIG. 11A, dashboard 1120 includes the details for a credential theft campaign. In particular, for the set of emails associated with the campaign, user actions taken can be displayed (e.g., clicked, report junk, and deleted unread, inbox, deleted, and quarantined). Activity associated with particular users (e.g., HVE) can also be visualize to ensure HVE are not part of specific campaigns. In FIG. 11B, dashboard 1120 includes actions taken by users can also be illustrated (e.g., safelinks block or safelink block override). In FIG. 12, dashboard 1210 includes status and impact information for a campaign (e.g., active status, start date, and impact—4 inbox and 1 clicked). In this way, the visualizations help summarize malicious activity operations data to facilitate improved access to campaign information and support performing additional operations based on the visualizations.

Malicious activity management operations further support clearing requests from customers, in particular requests to project their studies, knowledge, or other information to their teams and upper management when describing security incidents in their infrastructure. This enables users to understand, feel comfortable, and increase use features and functionality described herein. Having visibility into instances of complex cyberattacks that were prevented or remediated is key in deriving a meaningful return on investment (ROI).

Another aspect of the reporting feature is the education awareness aspect of real world attacks. From a service point of view, there is a need to extend the reach of campaign intelligence and visualizations outside portals and dashboards because these dashboard usually have restricted access. Security operations teams and other personnel go through a lot of manual work to take screenshots and arrange information in preparation for internal communications, post-mortems, etc. The malicious activity management operations support generating, automatically or otherwise, campaign write-ups and produce, based on any email campaign entity, a written summary of a cyberattack. Campaign write-ups can be generated in different ways: 1) By a user, when viewing a Campaign Detail page. Behind the Export button a Export Write-up button can trigger this feature; 2) By a user when viewing Top Campaigns or Security Dashboard (context menu→Export write-up) or Explorer, or Attack simulator; 3) By a product team, marketing, pre-sales, compete team, which can request write-ups of attacks in specific customer environments; 4) Scheduled campaign reports can be generated and emailed to another user or users in another user database.

The malicious activity management operations ensure the campaign write-up follows a coherent template, in terms of the document sections and the type and granularity of the data that is included. This allows predictability for users of these write-ups in terms of what sections to add, remove, or modify depending on their particular audience for the final write-up. For example, if a CISO wants to reach the broader employee base and educate them on a recent phishing incident might exclude the specific users that fell victim to the phish or malware, or exclude some mail flow vulnerabilities (e.g. allow lists) that might have made the attack possible. The same CISO that might want to communicate to the Mail Admin team misconfigurations exploited by the attack by listing details on specific messages that evaded detection and mail routes (e.g., timestamps and messageIDs, domains, etc.). The same CISO when communicating the same attack to other executives might chose to list the specific users that were impacted, in what way, what was the exposure, what specific measures have been taken by internal security organizations. The write-up templates generated by embodiments of the present invention can be thought as a parametrized text that will be filled in with specific sections and data points. The sections of the write-up generated by embodiments of the present invention may include, but are not limited to, a cover page, an executive summary, the nature of the threat and payload, the timeline, propagation, morphing, the victimology, impact in the enterprise, and follow-up actions.

Figure 13:
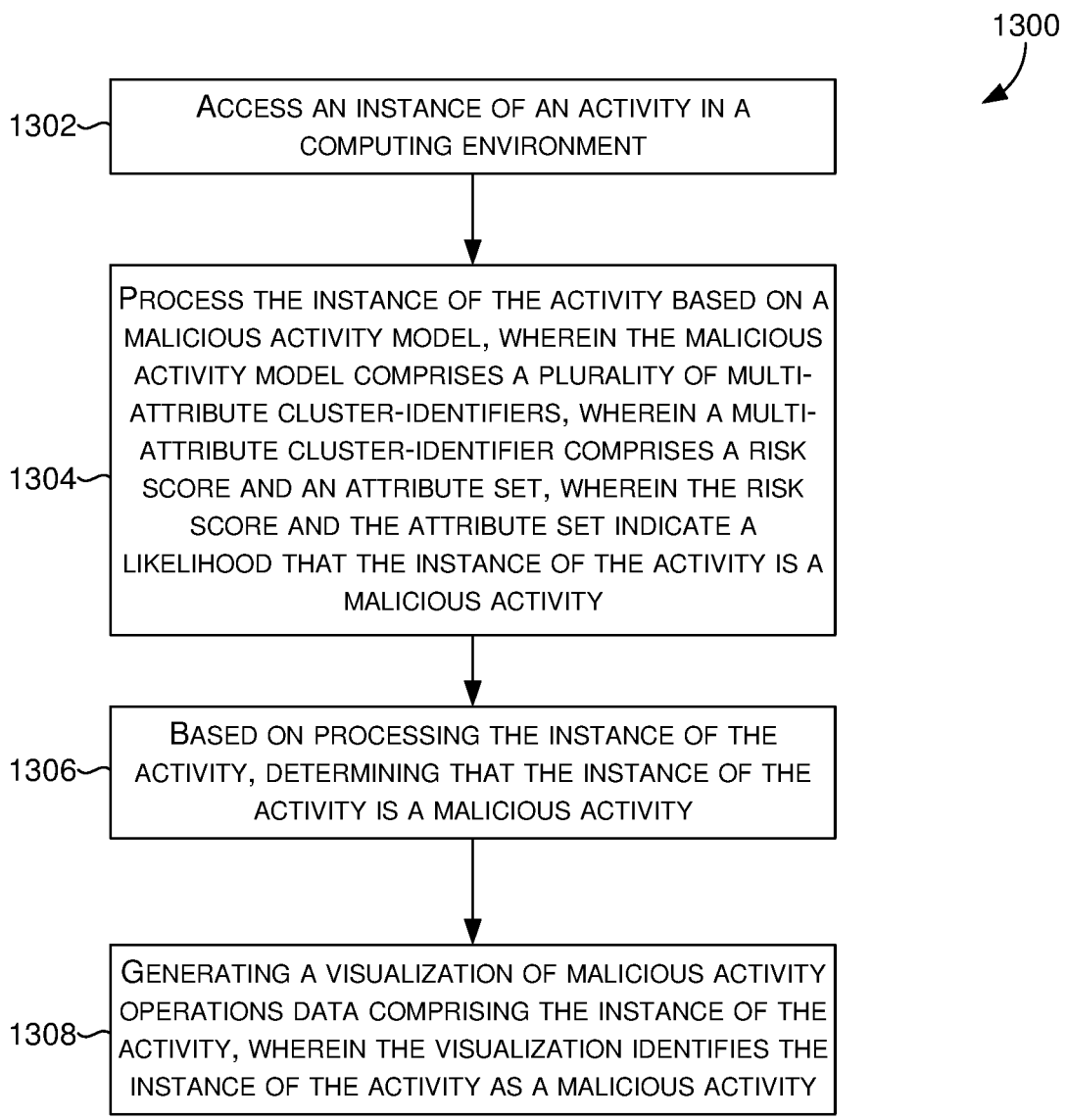
FIG. 13 provides a first example method of providing malicious activity management operations, in accordance with aspects of the technology described herein.
Figure 14:
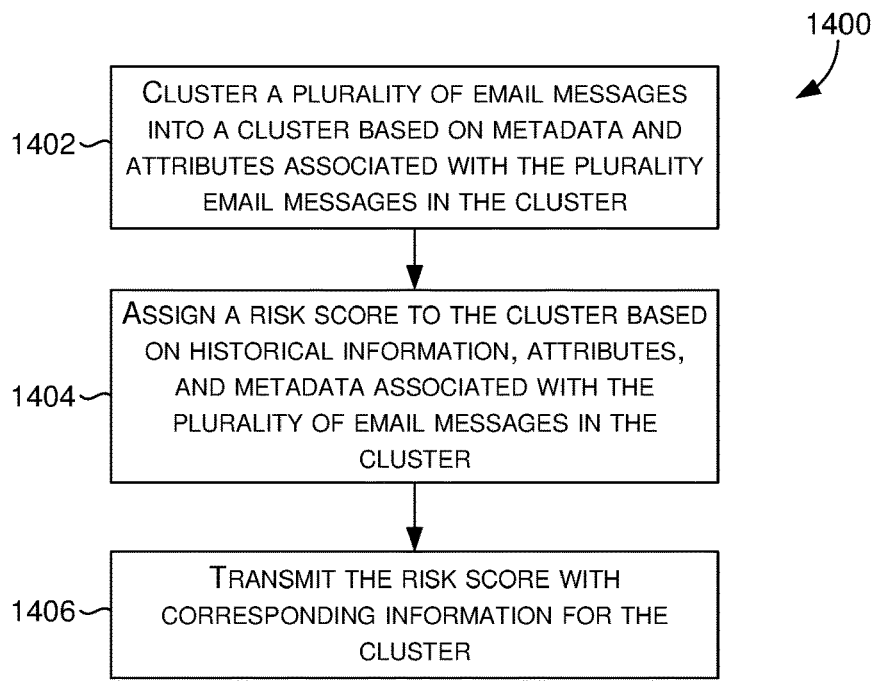
FIG. 14 provides a second example method of providing malicious activity management operations, in accordance with aspects of the technology described herein.
Figure 15:
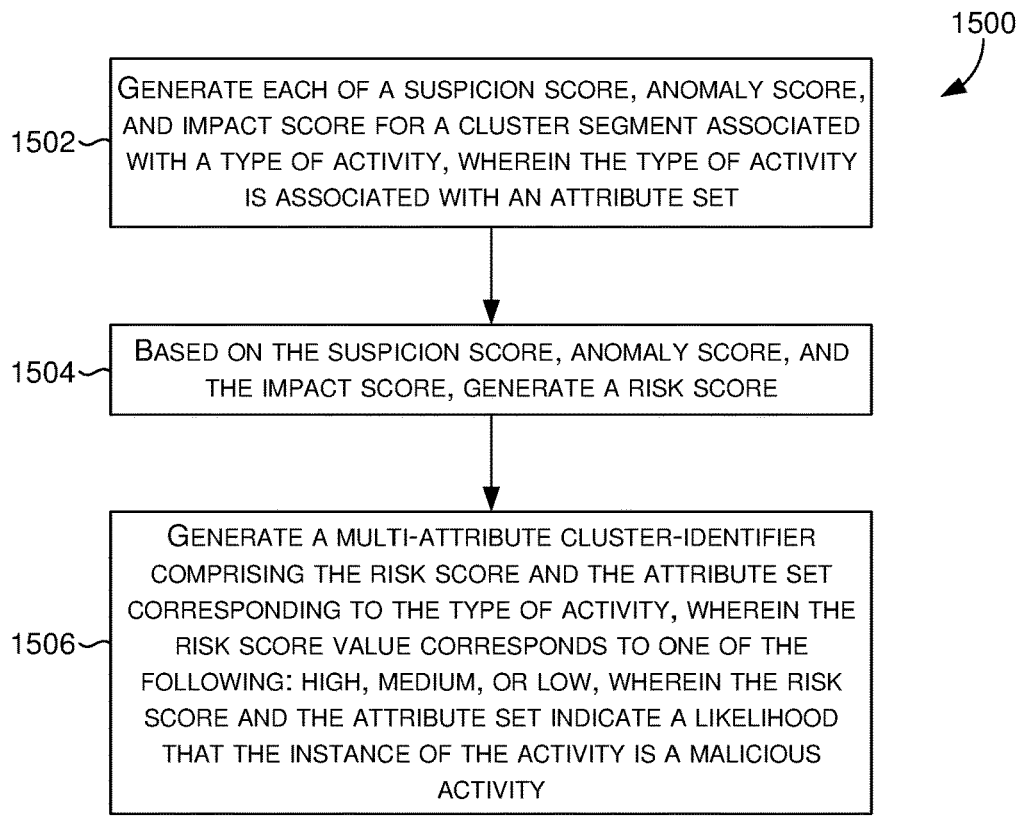
FIG. 15 provides a third example method of providing malicious activity management operations, in accordance with aspects of the technology described herein.

Example Methods for Providing Malicious Activity Management Based on Malicious Activity Management Operations With reference to FIGS. 13, 14 and 15, flow diagrams are provided illustrating methods for providing malicious activity management based on malicious activity management operations. The methods may be performed using the malicious activity management environment described herein. In embodiments, one or more computer storage media having computer-executable instructions embodied thereon that, when executed, by one or more processors can cause the one or more processors to perform the methods in the storage system.

Turning to FIG. 3, a flow diagram is provided that illustrates a method 1300 for providing malicious activity management operations. At step 1302, access an instance of an activity in a computing environment. At step 1304, process the instance of the activity based on a malicious activity model. The malicious activity model comprises a plurality of multi-attribute cluster-identifiers. A multi-attribute cluster-identifier comprises a risk score and an attribute set that indicate a likelihood that the instance of the activity is a malicious activity. At step 1306, based on processing the instance of the activity, determining that the instance of activity is a malicious activity. At step 1308, generate a visualization of malicious activity operation data comprising the instance of the activity. The visualization identifies the instance of the activity as a malicious activity.

Turning to FIG. 4, a flow diagram is provided that illustrates a method 1400 for providing malicious activity management operations. At step 1402, cluster a plurality of email messages into a cluster based on metadata and attributes associated with the plurality of email messages in the cluster. At step 1404, assign a risk score to the cluster based on historical information, attributes, and metadata associated with the plurality of email messages in the cluster. At step 1406, transmit the risk score and corresponding information for the cluster.

Turning to FIG. 5, a flow diagram is provided that illustrates a method 1500 for providing malicious activity management operations. At step 1502, generate each of a suspicion score, anomaly score, and impact score for a cluster segment associated with a type of activity. The type of activity is associated with an attribute set. At step 1504, based on the suspicion score, anomaly score, and the impact score, generate a risk score. At step 1506, generate a multi-attribute cluster-identifier comprising the risk score and the attribute set corresponding to the type of activity. The risk score value corresponds to one of the following: high, medium, or low. The risk score and the attribute set indicate a likelihood that the instance of the activity is a malicious activity.

Example Distributed Computing Environment

Figure 16:
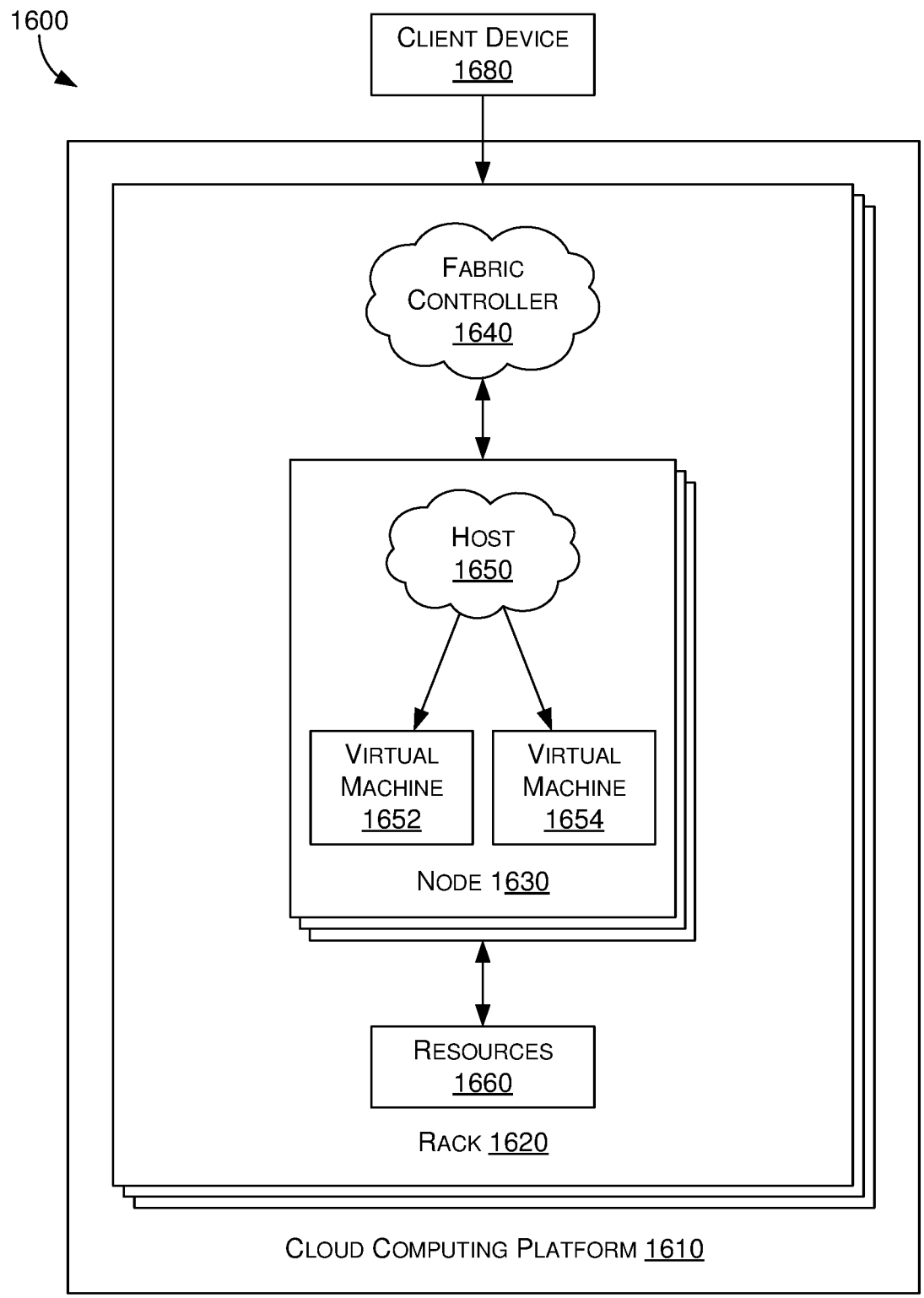
FIG. 16 provides a block diagram of an exemplary distributed computing environment suitable for use in implementing aspects of the technology described herein.

Referring now to FIG. 16, FIG. 16 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 1600 that includes cloud computing platform 1610, rack 1620, and node 1630 (e.g., computing devices, processing units, or blades) in rack 1620. The technical solution environment can be implemented with cloud computing platform 1610 that runs cloud services across different data centers and geographic regions. Cloud computing platform 1610 can implement fabric controller 1640 component for provisioning and managing resource allocation, deployment, upgrade, and management of cloud services. Typically, cloud computing platform 1610 acts to store data or run service applications in a distributed manner. Cloud computing infrastructure 1610 in a data center can be configured to host and support operation of endpoints of a particular service application. Cloud computing infrastructure 1610 may be a public cloud, a private cloud, or a dedicated cloud.

Node 1630 can be provisioned with host 1650 (e.g., operating system or runtime environment) running a defined software stack on node 1630. Node 1630 can also be configured to perform specialized functionality (e.g., compute nodes or storage nodes) within cloud computing platform 1610. Node 1630 is allocated to run one or more portions of a service application of a tenant. A tenant can refer to a customer utilizing resources of cloud computing platform 1610. Service application components of cloud computing platform 1610 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1630, nodes 1630 may be partitioned into virtual machines (e.g., virtual machine 1652 and virtual machine 1654). Physical machines can also concurrently run separate service applications. The virtual machines or physical machines can be configured as individualized computing environments that are supported by resources 1660 (e.g., hardware resources and software resources) in cloud computing platform 1610. It is contemplated that resources can be configured for specific service applications. Further, each service application may be divided into functional portions such that each functional portion is able to run on a separate virtual machine. In cloud computing platform 1610, multiple servers may be used to run service applications and perform data storage operations in a cluster. In particular, the servers may perform data operations independently but exposed as a single device referred to as a cluster. Each server in the cluster can be implemented as a node.

Client device 1680 may be linked to a service application in cloud computing platform 1610. Client device 1680 may be any type of computing device, which may correspond to computing device 1700 described with reference to FIG. 17, for example, client device 1680 can be configured to issue commands to cloud computing platform 1610. In embodiments, client device 680 may communicate with service applications through a virtual Internet Protocol (IP) and load balancer or other means that direct communication requests to designated endpoints in cloud computing platform 1610. The components of cloud computing platform 610 may communicate with each other over a network (not shown), which may include, without limitation, one or more local area networks (LANs) and/or wide area networks (WANs).

Example Operating Environment

Figure 17:
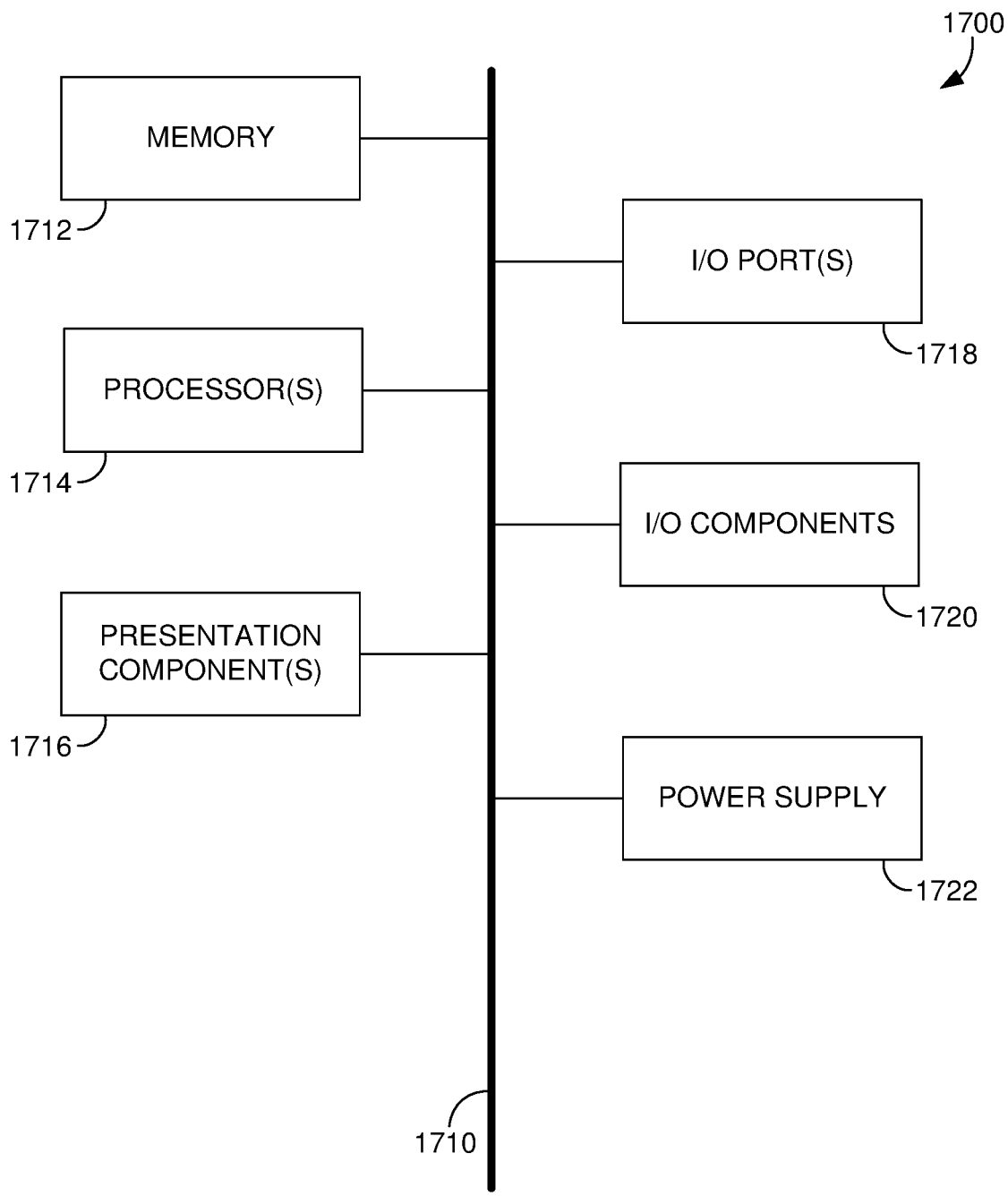
FIG. 17 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 17 in particular, an example operating environment for implementing embodiments of the present invention is shown and designated generally as computing device 1700. Computing device 1700 is but one example of a suitable computing environment and is not intended to suggest any limitation as to the scope of use or functionality of the invention. Neither should computing device 1700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 17, computing device 1700 includes bus 1710 that directly or indirectly couples the following devices: memory 1712, one or more processors 1714, one or more presentation components 1716, input/output ports 1718, input/output components 1720, and illustrative power supply 1722. Bus 1710 represents what may be one or more buses (such as an address bus, data bus, or combination thereof). The various blocks of FIG. 17 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 17 is merely illustrative of an example computing device that can be used in connection with one or more embodiments of the present invention. Distinction is not made between such categories as "workstation," "server," "laptop," "hand-held device," etc., as all are contemplated within the scope of FIG. 17 and reference to "computing device."

Computing device 1700 typically includes a variety of computer-readable media. Computer-readable media can be any available media that can be accessed by computing device 1700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1712 includes computer storage media in the form of volatile and/or nonvolatile memory. The memory may be removable, non-removable, or a combination thereof. Exemplary hardware devices include solid-state memory, hard drives, optical-disc drives, etc. Computing device 1700 includes one or more processors that read data from various entities such as memory 1712 or I/O components 1720. Presentation component(s) 1716 present data indications to a user or other device. Exemplary presentation components include a display device, speaker, printing component, vibrating component, etc.

I/O ports 1718 allow computing device 1700 to be logically coupled to other devices including I/O components 1720, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an Application Programming Interface (API) library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method, the method comprising:

accessing an instance of an activity in a computing environment, wherein the instance of the activity comprises an attribute set of the instance, wherein attribute set of the instance comprises at least one attribute;

receiving the instance of the activity at a malicious activity model that comprises a multi-attribute cluster identifier associated with a previous instance of the activity, the multi-attribute cluster-identifier comprising a risk score and an attribute set of the multi-attribute cluster-identifier, wherein the attribute set of the multi-attribute cluster-identifier comprises at least one attribute, the risk score and the attribute set of the multi-attribute cluster-identifier indicate a likelihood that the instance of the activity is a malicious activity, wherein the risk score is based on the following: a suspicion score, an anomaly score, and an impact score, each based on information from a cluster that is indicative of malicious activity, wherein the suspicion score is based on information about a tenant of the computing environment, wherein the anomaly score is based on information regarding a sender, wherein the impact score is based on a position of one or more individuals targeted by an instance of the activity in a corresponding cluster, wherein the multi-attribute cluster-identifier is based on the suspicion score, the anomaly score, the impact score, and the risk score, wherein the suspicion score, the anomaly score, and the impact score are associated with a cluster segment having a type of activity, wherein the type of activity is associated with an attribute set of the type of activity, determining, using the malicious activity model, that the instance of the activity is a malicious activity based on comparing the attribute set of the instance of the activity to the attribute set of the multi-attribute cluster-identifier, wherein the attribute set of the instance of the activity matches the attribute set of the multi-attribute cluster-identifier, the risk score and the attribute set of the multi-attribute cluster-identifier indicate a likelihood that the instance of the activity is a malicious activity;

generating a visualization of malicious activity operations data comprising the instance of the activity, wherein the visualization identifies the instance of the activity as the malicious activity.

2. The method of claim 1, wherein the malicious activity model comprises a plurality of multi-attribute cluster identifiers each associated with corresponding previous instances of the activity, wherein the instance of the activity is an email message, wherein generating the malicious activity model for a plurality of email messages comprising:

clustering the plurality of email messages into two or more clusters based on the metadata and attributes associated with the plurality email messages in the cluster; and assigning risk scores to each of the two or more clusters based on historical information, attributes, and metadata associated with the plurality of email messages in the two or more clusters.

3. The method of claim 2, wherein clustering the plurality of email messages into the two or more clusters is based on:
identifying centroids with associated metadata attributes of the plurality of email messages, wherein the centroids are calculated based on the fingerprints of the plurality email messages;
identifying common metadata attributes among the plurality of email messages;
applying filters based on the common metadata attributes, wherein applying filters based on the common metadata attributes identifies two of more subsets of the plurality of email messages; and
generating campaign guides associated with each of the two or more subsets of the plurality of email messages, wherein a campaign guide links to the common metadata attributes corresponding to a subset of the plurality of email messages.

4. The method of claim 1, wherein the impact score is further based on classification of content in the corresponding cluster, or website information included in the previous instances of the activity.

5. The method of claim 1, wherein the malicious activity model is a machine learning model that is generated based on processing a plurality of email messages associated with a plurality cyberattacks,
wherein the processing the plurality of emails messages is based on clustering the plurality of emails based on action taken by recipients of the plurality of emails, attachments in the email, and corresponding fingerprints of the plurality of emails.

6. The method of claim 1, wherein the malicious activity model is a malicious activity determination model that is used to compare the attribute set of the instance of the activity to identify the multi-attribute cluster-identifier that indicates the likelihood that the instance of the activity is a malicious activity.

7. The method of claim 1, wherein the malicious activity model is configurable for processing a plurality of instances of the activity at a tenant level, a global level, or a combined tenant-global level.

8. The method of claim 1, wherein the malicious activity operations data is selected from each of clustering analysis, risks scores, attribute sets, evaluation results for generating corresponding clustering analysis visualizations, risk scores visualization, attributes set visualization and evaluation results visualizations.

9. The method of claim 1, the method further comprising executing one or more remediation actions that are associated with instance of the activity, wherein the one or more remediation actions are executed based on a severity of the risk score, wherein the risk score value corresponds to one of the following: high, medium, or low.

10. A system comprising:
one or more computer processors; and computer memory storing computer-useable instructions that, when used by the one or more computer processors, cause the one or more computer processors to perform operations comprising:
accessing an instance of an activity in a computing environment, wherein the instance of the activity comprises an attribute set of the instance, wherein attribute set of the instance comprises at least one attribute;
receiving the instance of the activity at a malicious activity model that comprises a multi-attribute cluster identifier associated with a previous instance of the activity, the multi-attribute cluster-identifier comprising a risk score and an attribute set of the multi-attribute cluster-identifier, wherein the attribute set of the multi-attribute cluster-identifier comprises at least one attribute,
the risk score and the attribute set of the multi-attribute cluster-identifier indicate a likelihood that the instance of the activity is a malicious activity,
wherein the risk score is based on the following: a suspicion score, an anomaly score, and an impact score, each based on information from a cluster that is indicative of malicious activity,
wherein the suspicion score is based on information about a tenant of the computing environment,
wherein the anomaly score is based on information regarding a sender,
wherein the impact score is based on a position of one or more individuals targeted by an instance of the activity in a corresponding cluster,
wherein the multi-attribute cluster-identifier is based on the suspicion score, the anomaly score, the impact score, and the risk score, wherein the suspicion score, the anomaly score, and the impact score are associated with a cluster segment having a type of activity, wherein the type of activity is associated with an attribute set of the type of activity,
determining, using the malicious activity model, that the instance of the activity is a malicious activity based on comparing the attribute set of the instance of the activity to the attribute set of the multi-attribute cluster-identifiers, wherein the attribute set of the instance of the activity matches the attribute set of the multi-attribute cluster-identifier, the risk score and the attribute set of the multi-attribute cluster-identifier indicate a likelihood that the instance of the activity is a malicious activity; and
generating a visualization of malicious activity operations data comprising the instance of the activity, wherein the visualization identifies the instance of the activity as the malicious activity.

11. The system of claim 10, wherein the malicious activity model comprises a plurality of multi-attribute cluster identifiers each associated with corresponding previous instances of the activity, wherein the instance of the activity is an email message, wherein generating the malicious activity model for a plurality of email messages comprising:
clustering the plurality of email messages into two or more clusters based on the metadata and attributes associated with the plurality email messages in the cluster; and
assigning risk scores to each of the two or more clusters based on historical information, attributes, and metadata associated with the plurality of email messages in the two or more clusters.

12. The system of claim 11, wherein clustering the plurality of email messages into the two or more clusters is based on:
identifying centroids with associated metadata attributes of the plurality of email messages, wherein the centroids are calculated based on the fingerprints of the plurality email messages;
identifying common metadata attributes among the plurality of email messages;

applying filters based on the common metadata attributes, wherein applying filters based on the common metadata attributes identifies two of more subsets of the plurality of email messages; and generating campaign guides associated with each of the two or more subsets of the plurality of email messages, wherein a campaign guide links to the common metadata attributes corresponding to a subset of the plurality of email messages.

13. The system of claim 10, herein the impact score is further based on classification of content in the corresponding cluster, or website information included in the previous instances of the activity.

14. The system of claim 10, wherein the malicious activity model is a machine learning model that is generated based on processing a plurality of email messages associated with a plurality cyberattacks, wherein the processing the plurality of emails messages is based on clustering the plurality of emails based on action taken by recipients of the plurality of emails, attachments in the email, and corresponding fingerprints of the plurality of emails.

15. The system of claim 10, the operations further comprising executing one or more remediation actions that are associated with the instance of the activity, wherein the one or more remediation actions are executed based on a severity of the risk score, wherein the risk score value corresponds to one of the following: high, medium, or low.

16. The system of claim 10, wherein the malicious activity model is configurable for processing a plurality of instances of the activity at a tenant level, a global level, or a combined tenant-global level.

17. One or more hardware computer-storage media device having computer executable instructions embodied thereon that, when executed by a computing system having a processor and memory, cause the processor to execute operations comprising:

accessing an instance of an activity in a computing environment, wherein the instance of the activity comprises an attribute set of the instance, wherein attribute set of the instance comprises at least one attribute;

receiving the instance of the activity at a malicious activity model that comprises a multi-attribute cluster identifier associated with a previous instance of the activity, the multi-attribute cluster-identifier comprising a risk score and an attribute set of the multi-attribute cluster-identifier, wherein the attribute set of the multi-attribute cluster-identifier comprises at least one attribute, the risk score and the attribute set of the multi-attribute cluster-identifier indicate a likelihood that the instance of the activity is a malicious activity, wherein the risk score is based on the following: a suspicion score, an anomaly score, and an impact score, each based on information from a cluster that is indicative of malicious activity, wherein the suspicion score is based on information about a tenant of the computing environment, wherein the anomaly score is based on information regarding a sender, wherein the impact score is based on a position of one or more individuals targeted by an instance of the activity in a corresponding cluster, wherein the multi-attribute cluster-identifier is based on the suspicion score, the anomaly score, the impact score, and the risk score, wherein the suspicion score, the anomaly score, and the impact score are associated with a cluster segment having a type of activity, wherein the type of activity is associated with an attribute set of the type of activity, determining, using the malicious activity model, that the instance of the activity is a malicious activity based on comparing the attribute set of the instance of the activity to the attribute set of the multi-attribute cluster-identifiers, wherein the attribute set of the instance of the activity matches the attribute set of the multi-attribute cluster-identifier, the risk score and the attribute set of the multi-attribute cluster-identifier indicate a likelihood that the instance of the activity is a malicious activity; and generating a visualization of malicious activity operations data comprising the instance of the activity, wherein the visualization identifies the instance of the activity as the malicious activity.

18. The media of claim 17, wherein the visualization of malicious activity operations data support visually exploring a campaign associated with the instance of the activity, executing bulk actions on all emails in a campaign, identifying indicators of compromise, and identifying tenant policies.

19. The media of claim 17, wherein the malicious activity operations data is selected from each of clustering analysis, risks scores, attribute sets, evaluation results for generating corresponding clustering analysis visualizations, risk scores visualization, attributes set visualization and evaluation results visualizations.

20. The media of claim 17, the operations further comprising executing one or more remediation actions that are associated with instance of the activity, wherein the one or more remediation actions are executed based on a severity of the risk score, wherein the risk score value corresponds to one of the following: high, medium, or low.

* * * * *